US011884008B2

(12) United States Patent
Kritchman et al.

(10) Patent No.: US 11,884,008 B2
(45) Date of Patent: Jan. 30, 2024

(54) SYSTEM AND METHOD OF MAKING PRINTED ARTICLES

(71) Applicant: XJET LTD., Rehovot (IL)

(72) Inventors: Eli Kritchman, Tel Aviv (IL); Wael Salalha, Beit Jann (IL); Tali Aqua, Rehovot (IL); Tal Sela, Tel Aviv (IL); Axel Benichou, Givaataim (IL); Doron Avramov, Yesha (IL); Yohai Dayagi, Kibutz Kramim (IL)

(73) Assignee: XJET LTD., Rehovot (IL)

( * ) Notice: Subject to any disclaimer, the term of this patent is extended or adjusted under 35 U.S.C. 154(b) by 0 days.

(21) Appl. No.: 18/053,635

(22) Filed: Nov. 8, 2022

(65) Prior Publication Data

US 2023/0158739 A1    May 25, 2023

Related U.S. Application Data

(62) Division of application No. 16/606,137, filed as application No. PCT/IB2018/000485 on Apr. 18, 2018, now Pat. No. 11,529,685.

(60) Provisional application No. 62/487,670, filed on Apr. 20, 2017.

(51) Int. Cl.
| | |
|---|---|
| *B33Y 10/00* | (2015.01) |
| *B29C 64/112* | (2017.01) |
| *B22F 12/55* | (2021.01) |
| *B22F 10/43* | (2021.01) |
| *B29C 64/336* | (2017.01) |
| *B29C 64/40* | (2017.01) |
| *B33Y 30/00* | (2015.01) |
| *B29C 64/165* | (2017.01) |
| *B33Y 50/02* | (2015.01) |
| *B33Y 70/00* | (2020.01) |
| *B29C 64/209* | (2017.01) |
| *B29C 64/393* | (2017.01) |
| *B28B 1/00* | (2006.01) |
| *B28B 17/00* | (2006.01) |
| *B22F 10/38* | (2021.01) |
| *B22F 10/62* | (2021.01) |
| *B22F 10/64* | (2021.01) |
| *B22F 10/66* | (2021.01) |
| *B29K 505/00* | (2006.01) |
| *B29K 509/02* | (2006.01) |
| *B22F 10/14* | (2021.01) |
| *B22F 12/90* | (2021.01) |
| *B22F 10/00* | (2021.01) |

(52) U.S. Cl.
CPC ............ *B29C 64/165* (2017.08); *B22F 10/38* (2021.01); *B22F 10/43* (2021.01); *B22F 10/62* (2021.01); *B22F 10/64* (2021.01); *B22F 10/66* (2021.01); *B22F 12/55* (2021.01); *B28B 1/001* (2013.01); *B28B 17/0081* (2013.01); *B29C 64/112* (2017.08); *B29C 64/209* (2017.08); *B29C 64/336* (2017.08); *B29C 64/393* (2017.08); *B29C 64/40* (2017.08); *B33Y 10/00* (2014.12); *B33Y 30/00* (2014.12); *B33Y 50/02* (2014.12); *B33Y 70/00* (2014.12); *B22F 10/00* (2021.01); *B22F 10/14* (2021.01); *B22F 12/90* (2021.01); *B29K 2505/00* (2013.01); *B29K 2509/02* (2013.01)

(58) Field of Classification Search
CPC ..... B29C 64/209; B29C 64/336; B29C 64/40; B29C 64/112; B22F 12/55; B22F 5310/10; B22F 5310/40; B22F 5310/43
See application file for complete search history.

(56) References Cited

U.S. PATENT DOCUMENTS

| | | |
|---|---|---|
| 6,332,943 B1 | 12/2001 | Herrmann et al. |
| 2008/0318189 A1 | 12/2008 | Brodkin et al. |
| 2010/0007696 A1 | 1/2010 | Silverbrook |
| 2012/0308837 A1 | 12/2012 | Schlechtriemen et al. |
| 2015/0197062 A1 | 7/2015 | Shinar et al. |
| 2015/0298394 A1 | 10/2015 | Sheinman |
| 2016/0229128 A1 | 8/2016 | Dayagi et al. |
| 2016/0243619 A1 | 8/2016 | Gothait |
| 2017/0072467 A1 | 3/2017 | Zehavi |

(Continued)

FOREIGN PATENT DOCUMENTS

| | | |
|---|---|---|
| CN | 1436032 | 8/2003 |
| CN | 101045395 | 10/2007 |

(Continued)

OTHER PUBLICATIONS

International Search Report dated Jan. 23, 2019 in International Application No. PCT/IB2018/000485 (10 pages).
Chinese Office Action dated May 11, 2022 corresponding to Chinese Patent Application No. 201880041290.0.
Chinese Office Action dated Jul. 7, 2021 corresponding to Chinese Patent Application No. 201880041290.0.

(Continued)

*Primary Examiner* — Mary Lynn F Theisen
(74) *Attorney, Agent, or Firm* — BROWDY AND NEIMARK, P.L.L.C.

(57) ABSTRACT

A system for forming a product with different size particles is disclosed. The system comprises at least one print head region configured to retain a first group of print heads configurable to additively print at least a first portion of the product with a first material and a second group of print heads configurable to additively print at least a second portion of the product with a second material. The described system may also comprise a processor configured to regulate the first group of print heads and the second group of print heads to distribute the first material and the second material. A method of making an object by ink jet printing using the disclosed system is also disclosed.

9 Claims, 14 Drawing Sheets

(56) References Cited

U.S. PATENT DOCUMENTS

2017/0297111 A1\* 10/2017 Myerberg ............... B28B 1/001
2018/0250877 A1 9/2018 Okamoto
2020/0101534 A1\* 4/2020 Gibson ................. B33Y 10/00

FOREIGN PATENT DOCUMENTS

| CN | 106414033 | 2/2017 |
| CN | 106488819 | 3/2017 |
| DE | 102011117005 | 4/2013 |
| JP | 2016-43610 | 4/2016 |
| WO | WO 2018164672 | 9/2018 |

OTHER PUBLICATIONS

Search Report dated Jun. 29, 2021 corresponding to Chinese Patent Application No. 201880041290.0.
Korean Office Action dated Jan. 16, 2022 in Korean Patent Application No. 10-2019-7033145 (7 pages).

\* cited by examiner

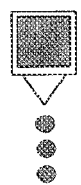
FIG. 2A
FIG. 2B
FIG. 2C
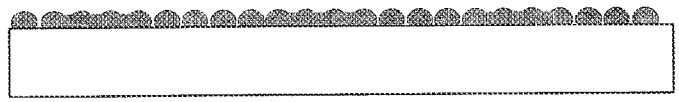
FIG. 2D
FIG. 2E
FIG. 2F I. Mono sized powder (big particles only)

II. Multi sized powder (big particles with small ones in between)

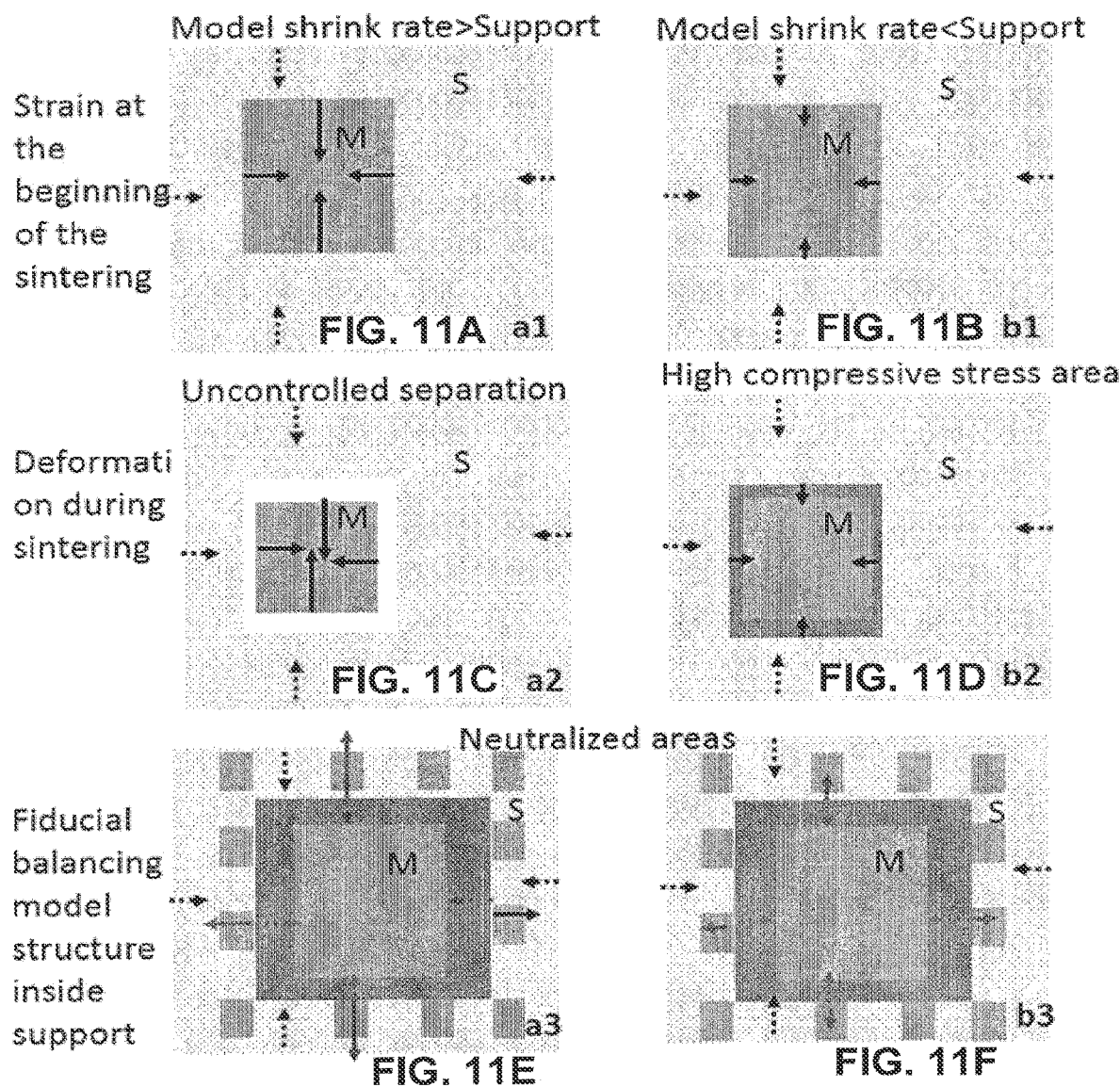

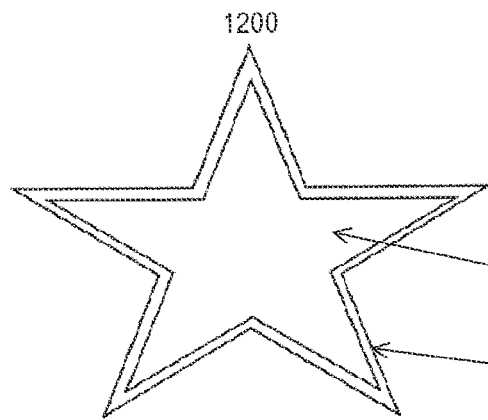
FIG. 12A
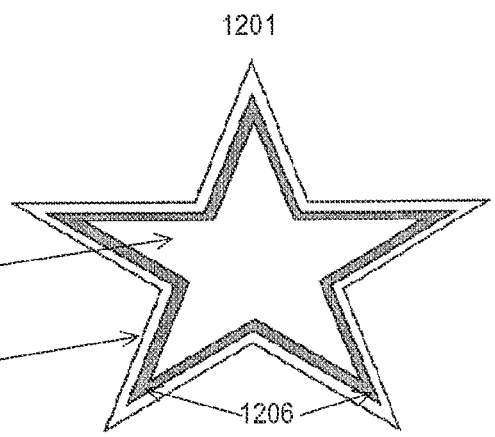
FIG. 12B
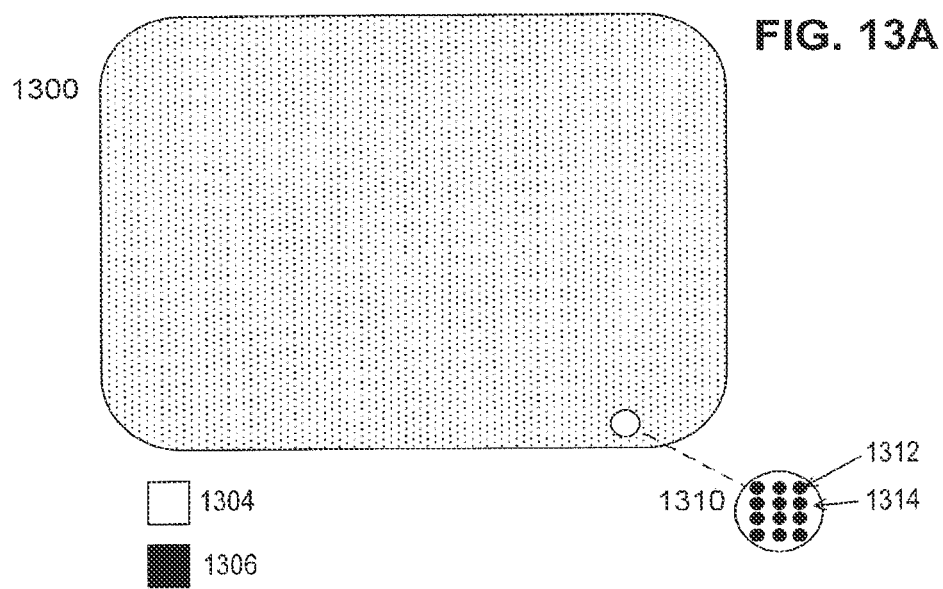
FIG. 13A
FIG. 13B

SYSTEM AND METHOD OF MAKING PRINTED ARTICLES

CROSS REFERENCES TO RELATED APPLICATIONS

This application is a divisional of U.S. patent application Ser. No. 16/606,137, filed Oct. 17, 2019, which is a national phase application under 35 U.S.C. § 371 of International Application No. PCT/IB2018/000485, filed Apr. 18, 2018, which claims the benefit of priority of U.S. Provisional Patent Application No. 62/487,670, filed on Apr. 20, 2017, all of which are incorporated herein by reference in their entirety.

TECHNICAL FIELD

The present disclosure relates generally to a system for forming a product with different size particles. In an embodiment, the system comprises a print head region that retains one or more print heads that are configured to additively print different sections or parts of a product, and a processor configured to regulate the print heads. The present disclosure also relates to methods of making a product, such as by using the disclosed system.

BACKGROUND

A three dimensional (3D) inkjet printing process is considered an additive manufacturing process such as direct metal laser sintering or selective laser sintering (DMLS and SLS respectively). Inkjet printing process is used to print plastic, metal or ceramic objects. Unlike DMLS or SLS, metal or ceramic objects printed by inkjet process are considered "green" objects which require final sintering stage. Since green part's mechanical properties are inferior to a fully sintered part, metal or ceramic 3D inkjet printing typically requires using at least two types of materials, a model material and a support material. The model material and the support material are ink-jetable inks. The model material is used to form the desired object, whereas the support material is used to form a desired support structure for at least part of the object. Such a support structure is configured to support the object during printing or until the model reaches an appropriate mechanical strength for self-supporting itself. The use of a support material is particularly desirable when the model contains channels or other voids, or requires printing at negative angles. Once the model reaches a self-supporting stage the support structure is removed.

One of the fundamental challenges in 3D printing is the development of support materials which allow printing a support structure that provides the functional support needed for the model printed before it reaches a self-supporting stage and can still be removed thereafter, leaving minimum cross-contamination of support material in the model. Therefore, support materials must be compatible with various properties of the model materials. For example, and according to an aspect of the present disclosure, and as will be explained in more detail below, it is important that the sintering temperatures of support structure be higher than that of the model materials The support material has to be removed during the post-printing process, either immediately after printing, or after sintering. The support removal might be done chemically, mechanically or thermally. Regardless of the method used to remove the support, some post-printing processing steps are required to convert the printed model into a solid metal or ceramic piece. One problem associated with removing the support after the printing stage and before the model reaches the self-supporting stage, is that the removal process may affect the integrity of the printed part. At this stage, the printed part can break easily.

The combinations of model materials and support materials for ink jet printing and methods of combining such materials disclosed in the present disclosure address the shortcomings of the prior art. The present disclosure also provides novel and inventive methods of making such inks to overcome one or more of the problems set forth above and/or other problems of the prior art. In particular, the present disclosure is directed to adjusting parameters between model and support inks to assist in the making of a product by inkjet printing, or to improve the results of the final printed model, or both.

SUMMARY

In part to address the foregoing needs, the present disclosure is directed to a system for forming a product. In an embodiment, the system comprises at least one print head region configured to retain a first group of print heads configurable to additively print at least a first portion of the product with a first material having a first average particle size. The first average particle size is chosen to impart a first sintering characteristic. The system described herein also comprises a second group of print heads configurable to additively print at least a second portion of the product with a second material having a second average particle size. The second average particle size is chosen to impart a second sintering characteristic.

The system described herein also comprises at least one processor configurable to receive information reflective of desired properties of the product, and to regulate the first group of print heads and the second group of print heads to distribute the first material and the second material in a layer-by-layer basis to impart differing characteristics to differing portions of the product based on the information reflective of the desired properties of the product.

The present disclosure is also directed to a method of making an object by ink jet printing, such as by using the disclosed system. In an embodiment, the method comprises jetting object material to form a product structure having a first sintering temperature. Simultaneous with or prior to forming the product structure, the method further comprises jetting support material including particles, to form a support structure, wherein the support structure is jetted in a manner supporting the product structure. In an embodiment, the support material has a sintering temperature that is greater than the sintering temperature of the object material. The jetted object and the jetted support together constitute a green part. The method further comprises heating the green part to a temperature at or above the first sintering temperature and below the second sintering temperature to thereby at least partially sinter the jetted object without substantially sintering the jetted support and removing the substantially unsintered support from the at least partially sintered object.

Aside from the subject matter discussed above, the present disclosure includes a number of other features such as those explained hereinafter. Both the foregoing description and the following description are exemplary only.

BRIEF DESCRIPTION OF THE DRAWINGS

The accompanying figures are incorporated in, and constitute a part of this specification.

FIGS. 2A-2F depicts an example of an additive manufacturing process according to an embodiment of the disclosure comprising spraying of a powder layer (FIG. 2A); evaporating the fluid to provide a powder layer of 1-5 μm regular size (FIG. 2B); ink jetting nano powder at a desired model area (FIG. 2C); hardening the model area (FIG. 2D); followed by repeated steps of applying additional layers of spraying large powders (FIG. 2E), and ink jetting of nano-powders (FIG. 2F).

FIG. 4C shows the structural particles removed.

FIG. 9A is a schematic showing particles wrapped with dispersing molecules at low temperature. FIG. 9B is a schematic showing particles left after losing the dispersing molecules at high temperature but below sintering.

FIGS. 11A-11F are schematics illustrating separation and deformation of model parts associated with high stresses and strains because of differences in shrink rate between the support material and the model material during sintering.

FIGS. 12A and 12B are diagrams of an object printed with different materials according to the present disclosure. FIG. 12A shows a coating over a bulk material, while FIG. 12B shows a coating over an impregnated layer, which is on a bulk material.

FIG. 13A is a representation of an object built with a mix of materials according to the present disclosure. FIG. 13B is an enlarged section of the object in FIG. 13A, showing how the object is comprises of a mix of alternating materials.

DETAILED DESCRIPTION

The present disclosure is generally directed to adjusting parameters between model and support inks to assist in the making of a product by inkjet printing. There are disclosed systems as well as multiple, integrated techniques to beneficially adjust parameters between model and support inks. These include:

Adjusting sintering temperature to insure the model sinters before the support to facilitate support removal post sintering. As described in more detail below, this may be done by material selection, particles size, particle distribution, or combinations thereof.

Controlling shrinkage between the model and support structure to avoid strains and cracks in the model along a range of temperatures, from printing, through green stage, brown stage, and final sintering.

Reducing cross contamination between the model and the support structure by selecting materials and or using additives that will help achieve this result.

Increasing printing speed by controlling particle sizes of both the model and support inks to quickly and efficiently cover both model and support areas.

The following is a general description of the various embodiments described herein, particularly as they relate to the disclosed printer, printing system(s), ink(s) and ink system(s), methods of using such systems and/or inks to make a product, and the resulting products made from the foregoing. Reference will now be made in detail to these foregoing embodiments implemented according to the present disclosure, the examples of which are illustrated in the accompanying drawings. Wherever possible the same reference numbers will be used throughout the drawings to refer to the same or like parts.

Printer

Figure 1:
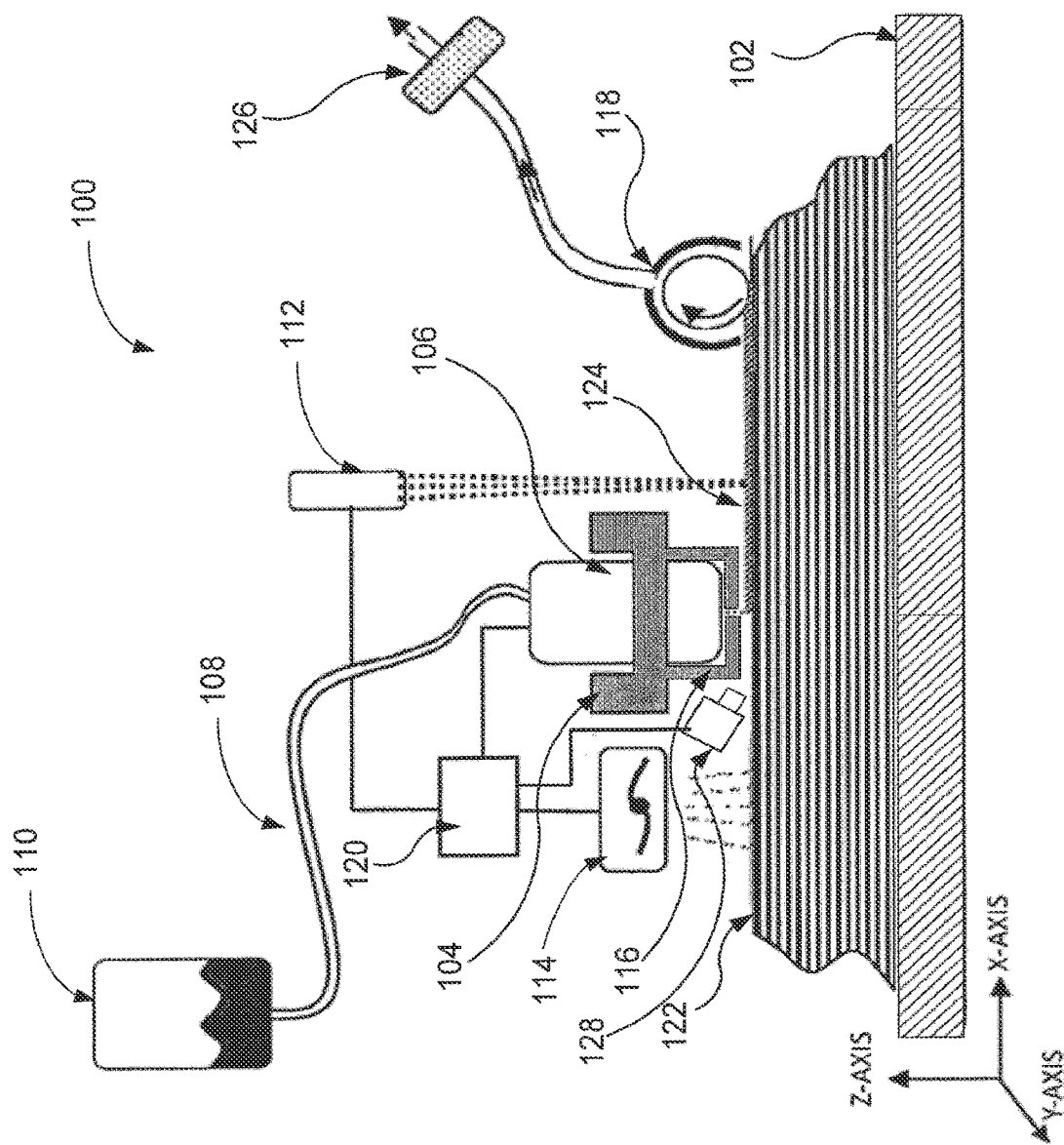
FIG. 1 depicts an example of an additive manufacturing apparatus according to the present disclosure.

In one embodiment, there is disclosed an additive manufacturing apparatus. As used herein, the term "additive manufacturing apparatus" broadly includes any device or system that can produce an object from a digital model by laying down successive layers of material until the object is created. FIG. 1 depicts an example of an additive manufacturing apparatus 100 in which various implementations, as described herein, may be practiced. As shown in FIG. 1 additive manufacturing apparatus 100 may include: a printing region 102, a print head holder 104 supporting at least one print head 106, at least one conduit 108 interconnecting print head 106 with an ink reservoir 110, an energy source 112, a cooling fan 114, a shield 116, a leveling apparatus 118, and a controller 120.

Printing region 102 may be used as a base for supporting the object to be constructed in an additive manufacturing process. The term "printing region" includes an area with any rigid surface capable of holding multiple layers of material dispensed from additive manufacturing apparatus 100. The terms "printing tray" and "printing table" may also be used interchangeably in this disclosure with reference to the printing region. In one embodiment, printing region 102 may include thermally conductive material, for example, or printing region 102 may include a tray made of metal. In this embodiment, printing region 102 may be warmed to a required object temperature to assist in solidifying a recently printed layer or to accelerate the evaporation of at least part of the ink liquid components. In alternative embodiment, printing region 102 may include thermally insulating material; for example, printing region 102 may include wood, plastic, or insulating ceramics. In both embodiments, printing region 102 may keep the object's temperature and heating the recently printed layer may be accomplished by direct heat radiation from above, for example, by using energy source 112, such as a halogen lamp, I.R lamp, UV lamp, a laser, flash-lamp or microwave source.

In one embodiment, printing region 102 may be a printing tray attachable to a tray holder (or "chuck"). The tray holder can comprise heating mechanism to heat the tray when required. The tray holder can comprise a rigid flat thermally conducting surface (optionally heated by heated means under covered) to which the tray is attached by any mean, including vacuum or clipping jigs. Alternatively the holder can comprise of a holding frame enclosing exposed heating means, e.g. radiating lamps that directly heat the tray. In one embodiment, the printing tray is replaceable. For example, when printing is finished, the operator may remove the tray with the printed objects thereon from the printer, install a clean tray in the printer, and start a new printing session.

In one embodiment the tray should be stiff. This is desired in order to prevent bending during detachment of the tray from the tray holder. In one embodiment, the tray holder may be flat. This is desired in order to enable good attachment between the tray holder surface and the tray and to also ensure good alignment between the printed object and the straight leveling apparatus. The tray should be thermally conductive and not too heavy. According to one embodiment, the tray is made of aluminum, and has a thickness ranging from about 3 to 12 mm.

The term "printing region" should not be confused with the term "printing surface." The term "printing surface" refers to a surface on which a new layer is to be printed. In the beginning of the printing process, printing region 102 may be the printing surface because the first layer may be printed directly on it. However, all the subsequent layers (e.g., the second layer), however, will be printed on top of previously deposited layers. Thus, for the second layer, the first layer is the printing surface, for the third layer, the second layer is the printing surface, etc. In the example depicted in FIG. 1, a printing surface 122 is a previously deposited layer and a new layer 124 is the layer that is currently being printed on top of printing surface 122. New layer 124 is built along the Z-direction during every printing pass and is also referred to as the "upper-layer" or the "most-recent layer."

According to aspects of the disclosure described herein, the model is printed on a support, wherein the support exhibits desirable properties, including a stability of stiffness, proper interface with the supported part material (model), and ease of separation from the model. According to another aspect, the support structure should also be detachable from the tray. It should be noted that according to an embodiment, a support structure is built between the part and the tray. In order to enable easy detachment of the printed parts from the tray, the very few support layers (e.g. between 1 to 10) may be different from subsequently deposited layers. In one embodiment, these few layers comprise only support material.

In other embodiments the few layers comprise a certain mixture or combination of support material and model material. In one embodiment, the model material may be added in a columns structure. The mixture in the few lowest layers may be different from the mixture in the layers above, and both different from the mixture of the support structure near the part. A more detailed description of this architecture is described in U.S. patent application Ser. No. 15/029,815, which is herein incorporated by reference.

To assist in the integrity of the final printed object, the printed objected may be cooled uniformly and evenly. In one embodiment, this may be done by holding the printing tray with the newly printed objects thereon, in a cooled environment, such as a thermally insulated cooling box, until the printed object reaches a desired temperature.

Consistent with embodiments of the present disclosure, and again with reference to FIG. 1, additive manufacturing apparatus 100 may include print head holder 104 for maintaining at least one print head 106 spaced from printing surface 122. The term "print head holder" includes any structure suitable for holding or retaining at least one print head 106 in a fixed distance from printing surface 122 or at a changing distance from printing region 102. Because the additive manufacturing process includes laying down successive layers of material, the height of the object is gradually growing. In one embodiment, after each layer is laid down, printing region 102 shifts a little lower in the Z-direction to maintain the fixed distance between at least one print head 106 and printing surface 122. In an alternative embodiment, after each layer is laid down, print head holder 104 shifts a little higher in the Z-direction to maintain the fixed distance between at least one print head 106 and printing surface 122. In one example, the fixed distance between print head 106 and printing surface 122 may be any value between 0.5 and 5 mm. In another alternative embodiment, after each layer is laid down, printing region 102 shifts a little lower in the Z-direction and print head holder 104 shifts a little higher in the Z-direction to maintain the fixed distance between at least one print head 106 and printing surface 122. For the sake of simplicity, the following discussion will assume that print head 106 is moving while the printing tray is stationary. However, in alternative embodiments, printing tray may be configured to move underneath print head 106.

According to some embodiments, print head holder 104 may support a single print head 106 or a plurality of print heads 106. The term "print head" refers to a plurality of nozzles organized in a linear array or a plate and generally manufactured together as one. When print head 106 is connected to additive manufacturing apparatus 100, the plurality of nozzles are configured to dispense ink from ink reservoir 110 to form the object layer-by-layer. At least one print head 106 may comprise a plurality of nozzles including a first nozzle group for dispensing a first model material and a second nozzle group for dispensing a second model material that differs from the first material. In one embodiment, a print head is characterized by its ability to include and manage a set of multiple nozzles; however, each printing head is fed by one type of ink whether model or support. As used herein, the term "object" is used to describe the combined model and support structure. In one embodiment, the first material may be used to print the model and the second material may be used to print the support. A typical case for this embodiment is when the desired object consists of two different materials. In another embodiment, the first material may be an object material used to produce the desired object and the second material may be a support material used temporarily during printing, for example, to support "negative" tilted walls of the object. Typically, print head 106 may scan new layer 124 in an X-direction substantially perpendicular to the longitudinal axis Y of new layer 124. As each object may be constructed from thousands of printed layers, typically thousands of cycles are necessary. In a case where each cycle includes multiple printings from a plurality of print heads 106, the number of cycles can be reduced from thousands to hundreds or less. Also, additive manufacturing apparatus 100 may produce multiple objects in the same run. In one embodiment, different print heads 106 may be employed for different printing materials having different nozzle sizes. For example, a first print head may be used for dispensing object material and a second print head may be used for dispensing support material. As another example, a first print head may have a first size of nozzles and a second print head may have a second size of nozzles which is different from the first size.

In some embodiments, additive manufacturing apparatus 100 may include at least one conduit 108 interconnecting print head 106 with an ink reservoir 110. The term "conduit" generally refers to a body having a passageway through it for the transport of a liquid or a gas. At least one conduit 108 may be flexible to enable relative movement between print head 106 and ink reservoir 110. In some embodiments, at least one conduit 108 may include a supply conduit interconnecting ink reservoir 110 with print head 106 for supplying ink to print head 106, and a return conduit (not shown) interconnecting print head 106 with ink reservoir 110 for circulating back to ink reservoir 110 at least a portion of the ink that was not expelled from print head 106. The term "ink reservoir" includes any structure configured to store ink until it is conveyed to print head 106. In some embodiments, ink reservoir 110 may include one or more tanks and an ultrasound-based element that is configured to send ultrasound or shock waves into the ink to prevent solid particles agglomeration in the ink or to break agglomerates if they already exist in the ink. In addition, additive manufacturing apparatus 100 may include a plurality of valves (not shown) operated by controller 120 and positioned along at least one conduit 108 to control the pressure in at least one print head 106, at least one conduit 108, and/or ink reservoir 110. A more detailed description of similar ink systems is described in U.S. patent application Ser. No. 15/921,279, which is herein incorporated by reference.

While it is typical to use a single printing head that dispenses a single ink, and more than one printing head for a specific ink, it is also possible to use a multi-nozzle array ink-jet head that dispense different inks, each in a separate nozzle array.

Third Printing Head Used for Ink Jet Printing Additives

In various embodiments, one or more additive materials may be added to the ink in order to assist in the processing of the final product, such as the printing or sintering step, or be printed from a separate head, to improve the properties of the final object, such as the color or mechanical properties of the printed object. In an embodiment, there is at least one separate head dedicated to dispensing the additive alone or the additive dissolved in an appropriate solvent. As used herein, this head, which is used to deposit a material other than the model or support printed using two separate print heads, is referred to as the "third print head" or the "additive head." A more detailed discussion of the types of additives is provided below. As the additive is being printed with a separate head, there is no issue of dissolving the additive in the target ink that may not be compatible with the additive. In addition, the use of an additive head makes it possible to dispense different amounts of additive in different zones of the object.

Heating Source For Printer. According to some embodiments, and with reference to FIG. 1, the disclosed additive manufacturing apparatus 100 may include an energy source, for example, energy source 112. The term "energy source" includes any device configured to supply energy to an object being printed by additive manufacturing apparatus 100. For example, supplying energy in the form of radiation or heat to new layer 124 may be used to evaporate the dispersant material and other organic additives and optionally initiate at least partial sintering between the object particles. In one example, energy source 112 may include a small spot size energy source, such as a lamp or a laser configured to irradiate or scan a line along new layer 124 in order to cause in situ debinding or sintering or at list partial sintering to a newly formed layer 124. In another example, energy source 112 may include a flash-lamp configured to cover an area of newly formed layer 124 in order to initiate partial or full in situ debinding or sintering. According to this aspect of the disclosure, energy source 112 may be configured to selectively sinter model ink only in order to avoid support ink sintering. Such a selectivity may be achieved by irradiating new layer 124 with wavelengths which are absorbed more in a model ink than in a support ink and/or by adding pigments to the model ink which increases its energy absorption to the irradiated wavelengths.

In a first embodiment, energy source 112 may be incorporated with printing region 102 to form a warm tray. When the printed object is being heated from below the heat constantly flows up to new layer 124, and because of the heat-flow resistance of the material, a temperature gradient is built, with high temperature at the bottom of the object and low temperature at the upper surface of the object (along the Z-axis). The temperature of the warm tray may be controlled higher and higher dependent upon the interim height of the object during printing, so as to keep the temperature of the upper-layer constant. A disadvantage of such procedure is that heating the lower layers to high temperature may adversely modify the organic molecules, such as those found in the dispersant and other additives, which may cause the organics to disintegrate into carbon and other residuals. Another disadvantage is that residual liquid that remains in the lower layers may evaporate and cause high gaseous pressure, which leads to crumbing or cracking the material. Generally it is not recommend to create a temperature difference between layers after drying because cracking may rise due to different thermal expansion of the layers.

In a second embodiment that is illustrated in FIG. 1, radiative energy source 112 may be located above the object being printed. The direct heating by the energy source 112 can assure constant temperature of new layer 124. The energy source 112 may be positioned aside print head 106, and can produce thermal radiation. e.g. electro-magnetic radiation. Since the porous body below the interim last layer absorbs part of the liquid carrier, drying the last layer becomes more and more difficult from layer to layer. Hence the intensity of the heat source should be increased as a function of the last layer interim height Z. Alternatively the heat source should move slower and slower along X or Y directions as a function of the object's height.

In a third embodiment, energy source 112 may include an aperture configured to blow a stream of hot air on new layer 124 at an angle. The use of hot air blow is not only for increasing the temperature of new layer 124 but also for reducing the partial pressure of the evaporated carrier liquid above the last layer, assisting thereby the evaporation of liquid carrier (and in some cases the dispersing agent and other organic material) from new layer 124. In addition, a combination of any of the first, second and third embodiments may be used to maximize the heating and/or evaporation performance.

Cooling Device. As mentioned above, warming new layer 124 may be part of the additive manufacturing process. However, in some embodiments the rest of the printed object should not be maintained at the same temperature as new layer 124. Accordingly, additive manufacturing apparatus 100 may include a cooling fan 114 for dissipating the heat stored in a recently printed layer to the surrounding air. One reason to cool a recently printed layer may be that when ink droplets land on a surface with a temperature high above the boiling temperature of a carrier liquid (e.g., by 30° C.) they may explode rather than attach to the surface, such as when water droplets land on a surface of 120° C. Thus, the rest of the object is not required to be maintained the same temperature as the temperature of new layer 124, only to be maintained at a constant and uniform temperature. For example, new layer 124 may be warmed to a temperature higher than the boiling temperature of the carrier liquid, (e.g., new layer 124 can be warmed to about 500° C.) when the previously printed layers may be maintained at a relatively lower temperature (e.g., about 230° C.) using cooling fan 114.

Heat Shield. In some embodiments, additive manufacturing apparatus 100 may also include a thermal buffer, such as shield 116. In the context of this disclosure, a heat shield refers to a plate that partially covers the nozzles array and has an opening to facilitate printing from nozzles to the printing area. Because the printed object is relatively hot (e.g., about 230° C.) as compared to room temperature (e.g., about 25° C.), print head 106 should be protected from the heat and fumes emerging from the printing area. In one embodiment, shield 116 may be maintained at a relatively low temperature compared to the temperature of the object while being printed (e.g., from 10 to 50° C.) to provide a thermal barrier between the print head 106 and the printed object.

Leveling Apparatus. Variations in process conditions, including different jetting power of the different nozzles, new layer 124 may not be perfectly flat. As a result of the liquid surface tension, the layer's edge may not be perfectly sharp. Therefore, additive manufacturing apparatus 100 may also include leveling apparatus 118 to flatten new layer 124 and/or sharpen one or more edges of new layer 124. In one embodiment, leveling apparatus 118 may include a vertical or horizontal grinding roller or cutting roller. In another embodiment, leveling apparatus 118 may include a dust pump and dust filter 126 to suck the dust output of leveling. During the printing process, leveling apparatus 118 may operate on new layer 124 while the layer is being dispensed and solidified. In one example, leveling apparatus 118 may peel off between about 5% and 20% of material of the upper-layer's height. In some embodiments, leveling apparatus 118 meets the ink after the carrier liquid has evaporated and new layer 124 is at least partially dry and solid.

Controlling and Processing Devices. The described additive manufacturing apparatus 100 can produce any object from a digital model. To do so, the additive manufacturing apparatus 100 may include a processing device, such as controller 120, for controlling the operation of different printing components. According to some embodiments, controller 120 may include at least one processor configured to determine how to operate additive manufacturing apparatus 100. The at least one processor may constitute any physical device having an electric circuit that performs a logic operation on input or inputs. For example, the at least one processor may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into controller 120 or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

In some embodiments, the memory is configured to store information representative of products associated with the visual codes. In some embodiments, controller 120 may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Printing Sensors. The described additive manufacturing apparatus 100 may include one or more sensors to make sure that the printing process progresses as planned. For example, additive manufacturing apparatus 100 may also include an imager, such as image sensor 128. The term "imager" or "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 128 may be part of a camera configured to capture printing region 102.

The following describes compositions and methods that the Inventors have discovered to improve the final printed model, including compositions and methods to adjust sintering temperature, shrinkage between the model and support structures, and cross contamination between the model and the support structure.

Ink Compositions

The additive manufacturing apparatus shown in FIG. 1 (100) may be configured to print more than one type of ink. The term "ink" includes any fluid intended for deposition on printing surface 122 in a desired pattern. Therefore, the term "ink" includes materials for the printing of the model, the support, or when present, additives from a third print head. These different inks may also be referred to as "model material", "support material", "additive manufacturing material," "printing material," and "printing liquid." These terms may be used interchangeably in this disclosure.

Printing a plurality of model inks in a given part is a unique and very important attribute of jet printing versus selective laser sintering printing. The combination can be done as a fine mix at a pixel scale, where the result is practically a homogeneous mix of materials, or at a macroscopic scale, by creating different areas of the part comprising different materials. In combined material printing the printer comprises plural IDS (Ink Delivery System) and plural heads, at least one head per jetted material. This technique has been specified in PCT_Friedman_3D Particle Printing_4619/20_Chapter 17, which is incorporated by reference. Consistent with the present disclosure, some examples of suitable inks may include the following attributes.

Particle size, material and shape. The inks described herein may include a dispersion of solid particles of any desired material, including but not limited to metals (e.g., iron, stainless steel, copper, silver, gold, titanium , etc.), ceramic material, metal oxides, oxides (e.g., $SiO_2$, $TiO_2$, $ZrO_2$, $BiO_2$), metal carbonates, metal carbides, carbides (e.g., WC, $Al_4C_3$, TiC), metal alloys (e.g., stainless steel, Titanium, Ti64), nitrides, inorganic salts, polymeric particles, and combinations thereof in a carrier liquid. In one embodiment, the solid particles comprise metals and metalloids chosen from silicon, aluminum, titanium, yttrium, cobalt, copper, iron, zinc, magnesium, zirconia, combinations or alloys thereof.

In various embodiments, the particles are of micron size (from about 0.5 μm to about 50 μm) or nanosize (from about 5 to about 500 nanometer) to maintain the required spatial resolution during printing, maintain the required material character (after sintering), or to satisfy limitations of a dispensing head. For example, when the dispensing print head includes nozzles of 30 μm diameter, the particle size should preferably be equal or smaller than 2 μm. In the context of this disclosure, the term "model materials" or "model inks" generally refers to solid materials or particles used to construct the model, whereas "support material" or "support inks" generally refers to material or solid particles used to construct the support structure, which is typically temporarily attached to the model.

Particle size is also important for high print resolution. Generally the particle size should not exceed roughly ¼ of the pixel size in the printed image map, but because of some agglomeration (of roughly 10 particles) that may be expected, it is desired that particle size should not exceed 1/10 pixel size. For example, when the pixel size is 15 micron, then the particles should be smaller than 1.5 micron. This ratio should be consistent with other pixel sizes and particle sizes.

In an embodiment, the solid particles in the model usually has a continuous multimodal particle size distribution. Yet in special cases the distribution is discrete, such as bimodal distribution. In an embodiment, the solid particles in the support material has a mono-modal particle size distribution. Such distribution has few advantages versus multi-modal, including better flow in the piping and heads (reducing clogging of the heads), and decreased tendency to sinter at high temperature. The particles sizes described herein are average particle diameters as determined using standard measurement techniques. For example, in one embodiment, the average particle size can be determined by examination of dry model powder with a scanning electron microscope (SEM). The average particle diameter may be an average value of the diameters of randomly selected particles, wherein the particle diameter is a Feret diameter measured in a fixed direction.

Adjusting Particle Size to Increase Print Speed. In one embodiment, the Inventors describe the use of big, less expensive particles (1-5 μm) to achieve fast printing volumes which covers both model and support areas followed by inkjetting an ink characterized by small nano-particles in a binder printing on model area only. With reference to FIG. 2, it has been discovered that the use of a combination of large micron sized powders (FIG. 2A), on which smaller nano-sized inks are jetted (FIG. 2B), provides the ability to print faster and more cost effectively. In this embodiment, the use of big, inexpensive 1-5 μm particles allows fast printing to cover both model and support area followed by the ink jetting of small nano-particles in a binder on model area only.

With reference to FIG. 2A, there is described a process in which a first step comprises spraying/spreading a dispersion of powder with 1-5 um size of powder via, for example, inkjet print heads having bigger nozzles, air, fluid or electrical spraying or by wire rod coating or by another method. As shown in FIG. 2B, in this stage, the tray is coated with a dispersion of powder and then the dispersing fluid is evaporated. After the dispersing fluid is evaporated, nano-sized powders are ink jet printed in the model, as shown in FIG. 2C. This is followed by a hardening step, as shown in FIG. 2D, either by thermal hardening using a binder or a partial-sintering process which may be in situ or not. The deposition steps are repeated for as many times as needed to get a desired thickness and profile, as shown in FIGS. 2E and 2F.

According to an embodiment, the dispersion of powder with 1-5 um size of powder, the big particles size dispersion, may include the same material as the small nano-particles ink. As a few non-limiting examples, the big and small particles may be stainless such as 316 or any other, Silica, any alloy, Zirconia and other metal or ceramic materials. According this embodiment during a debinding step or any pre-sintering step, a green or brown areas will be created in the model area due to the tendency of the small particles to create necking, therefore provide some hardening or any other mechanical characteristic so that model areas are self-supported, while support areas with big particles only will remain in a more separable structure. According to another embodiment, the big size particles and the small size particles may be of different material. One non-limiting example is big size Zirconia particles dispersion and stainless or copper nano particles. According to another non-limiting example, the big size particles may be WC while the small size particles may be stainless or copper.

Support Inks. The support material described herein may remain as an integral part of the finished product to form a multi-component material. Alternatively, the support material is removed once the object has been printed, and typically prior to any post printing processes, including heat treatments such as sintering. Alternately, the support structure printed with the support ink may remain with the printed object during post printing processes. In these cases, the support structure of the support ink must remain sufficiently soft and/or brittle to be removable after the sintering process. The metal composition of the final object is similar or close to that of the initial ink, but in some embodiments it can be different than the starting composition, due to the loss of some of the material during the printing process.

A detailed description of the support materials is described in WO2015056232 A1 (Patent Application number PCT/IB2014/065402), which is herein incorporated by reference. Support inks, according to the embodiments disclosed herein, comprise chemical entities including solid particles, for example, dispersed in carrier vehicles, dispersing agents (dispersants) and additives described herein.

Solid Particles for Support Inks. In one embodiment, the support material comprises particles of one or more types of materials and/or particle sizes. For example, in one embodiment, the one or more types of particles may be mixed together. Particle sizes are indicated by diameters, where not specifically indicated. As described, the particles range in diameter from nanometer scale, e.g., (approximately 10 nm to less than 500 nm, such as 400 nm, or 300 nm), to submicron (approximately 0.5 μm to approximately 1 μm), to micron (up to 50 μm) and provide the general features of the support. Optionally, the solid particles are miscible or at least partially soluble in water, basic, or aqueous acidic solution.

In various embodiments, the particle sizes of the solid particles of the support materials are 1.0 micron or more, at least 2.0 micron, at least 10.0 micron, at least 20.0 micron, or up to 50.0. In one embodiment, the particle size of the solid particles of the support materials range from 1.0 micron to 50 micron, such as 1.0 micron to 5.0 micron. In addition, the particle size of the solid material in the model ink is 0.5 micron or less, such as 0.4 micron or less, 0.3 micron or less, 0.2 micron or less, 0.1 micron or less 50 nm, such as 10 nm. In one embodiment, the particle size of the model particles range from 10 nm to 0.5 micron.

In various embodiments, the solid particles comprise one or more metal or ceramic materials, oxides, carbides, nitrides, or carbonates. Non limiting examples of such oxides and carbonates that can be used as solid particles include Silicon Oxide (silica-$SiO_2$), Aluminum Oxide ($Al_2O_3$-alumina), Titanium Oxide ($TiO_2$-Titania), Yttrium Oxide ($Y_2O_3$-Yttria), Cobalt Oxide (CoO), Copper Oxide (CuO), Iron Oxide ($Fe_2O_3$), Zinc oxide (ZnO), Magnesium oxide (MgO), Zirconium oxide ($ZrO_2$—Zirconia), Iron carbonate ($FeCO_3$), and organic or inorganic salt.

In one embodiment, the support materials comprises $FeCO_3$ particles. $FeCO_3$ is a brittle material that is thermally decomposing at temperatures ranging from 500 to 700° C. to iron oxide and $CO_2$. $FeCO_3$ powder can be dispersed in solution to form a jettable ink which can be deposited from inkjet print head onto a substrate in order to provide a support structure for model ink that are containing iron. $FeCO_3$ particles can be dispersed in a carrier liquid using commercially available dispersants. Other benefits associated with the use of $FeCO_3$ is that it reduces its size during chemical decomposition into iron oxide. Not only can iron oxide be easily removed, but iron oxide contaminants in the model can be converted into metallic Fe during sintering. As a result, a model piece can be produced with mechanical properties that are not affected by contamination.

Salt support. In another embodiment, the support comprises the same model particles mixed with other material or particles, e.g. silica or organic or inorganic salt, which inhibit sintering of the support particles. An advantage of this support material is that part of residual support material that inadvertently contaminates the model comprises the same model material. Support material based on salt has a number of advantages, including the fact that it is easily washed in water, due to the high dissolving power of water per salt. In fact, if removal of the support is accomplished before sintering (at green or brown stage), since the part is porous, the water flows through the entire model material (not only at its outer surface) and washes out the contaminating salt in the bulk of the part. Thus any contamination is prevented. In one embodiment, to facilitate green stage support removal, an inorganic salt may be preferred over organic because the later may be impaired at elevated temperature.

In another embodiment the support comprises just salt. When addition of model material is required, the addition may be done during printing, on a printing map basis. In that case the mix can be done homogeneously, by interlacing model and support pixels, or non-homogeneously, by printing islands of model pixel groups in the support matrix. This technique not only simplifies the production of the support material, but also eliminates the need to manufacture personal support for each model material type that is printed. An additional advantage of this technique is that it allows flexibility in determining the ratio between salt and model material in the support, including the possibility to control the ratio as a function of the distance from the printed part.

Salt support may be implemented either as salt solution in liquid, or salt particle dispersion. In one embodiment, salt may also be a combination of particles, such as silicate nanoparticles, and inorganic or organic salt particles or a solution of it.

In one embodiment, the support ink comprises insoluble salt particles, wherein the salt could be inorganic or organic. Particle size for these inorganic or organic salt may range from 10 to 800 nm, such as from 50 to 600 nm, or even 100 to 500 nm. Insoluble salt particles means insoluble in water, nor in ink solvent mix (both model and support). In other words, salt support ink is characterized by a first solvent, in which the salt is insoluble. In order to remove such support, at any stage whether before or after sintering, a second solvent is used in which the salt is soluble. Salt support removal solvent, the second solvent, may be applied in different forms such as for example spraying, jetting of the printed part or by immersion the printed part in a bath of aqua solution. The aqua solution bath, which contains the second solvent may enhance the removal of the support by mechanical elements which are configured to increase the flow of the aqua media over the printed part or by creating mechanical vibration or pulses to the aqua media. According to another aspect, the printed part may be located on a vibrated tray to enhance the removal of the support.

Carrier liquid. The previously described particles may be dispersed in a carrier liquid, also referred to as a "carrier" or "solvent". According to one embodiment, the carrier liquid may evaporate immediately after printing so that the succeeding layer is dispensed on solid material below. Therefore, the temperature of an upper-layer of the object during printing should be comparable with the boiling temperature of the carrier liquid. In order to decrease the heat power during printing, it is desired that boiling point should not be too high. In order to enable jet ability, the viscosity of the ink, which mainly depend on that of the carrier liquid, should not be too high. Also the surface tension of the liquid should be compatible with the jetting head requirement. In an embodiment proper carrier liquid has a boiling point of 100 to 250° C., viscosity of 3 to 30 at 24° C., surface tension of 20 to 70 milli-Newton/m.

In another embodiment, the temperature of the upper-layer is much higher than the boiling temperature of the liquid carrier, encouraging thereby the evaporation of other organic materials like dispersants or various additives in the carrier liquid.

Dissolved Model Material. At least part of a solid material in the form of micro or nano sized particles to be used to construct the object can be dissolved in the carrier liquid. For example, a dispersion of silver (Ag) particles, which in addition to the Ag particles includes a fraction of Ag organic compound dissolved in the carrier liquid. After printing and during firing, the organic portion of the Ag organic compound evaporates, leaving the metal silver atoms well spread. Ink comprising dissolved silver is readily available such as Commercial DYAG100 Conductive Silver Printing Ink, from Dyesol Inc. (USA), 2020 Fifth Street #638, Davis Calif. 95617.

Dispersing Agent. In order to sustain particle dispersion, a dispersing agent, also known as dispersant, may assist in dispersing the particles in the carrier liquid. Dispersants are known in the industry, and are often a kind of polymeric molecule. In general, the dispersing molecules adhere to the solid particle's surface (i.e., wrap the particles) and inhibit agglomeration of the particles to each other. When more than one solid particle species are dispersed in the dispersion, using the same dispersant material for all solid particle species is preferred so compatibility problems between different dispersant materials are avoided. The dispersing agent should also be able to dissolve in the carrier liquid so that a stable dispersion can be formed.

The dispersing agent should also be compatible with the liquid carrier, for stability purposes. In water based inks, for example, the stabilization can be achieved by proper control of the surface properties, such as by changing the pH of the dispersion. It should be noted that the stabilizer (i.e. the dispersing agent) may be bound to the particles' surface by covalent bonds or by physical adsorption.

An additional role of the dispersing agent is appreciated during printing. During printing, after jetting and drying, the dispersing agent assists in gluing and binding the particles to each other. Notice that this is an opposite role of the dispersing agent when the particle are dispersed in the liquid carrier. When further binding is required, special binding additives are added to the ink dispersion.

Non-limiting examples of dispersing agents that can be used herein include: Disperbyk 180, Disperbyk 190, Disperbyk 163 from BykChemie. Solsperse 39000, Solsperse 33000, Solsperse 35000 from Lubrizol. Rheosperse3020, 3450, 3620 from Coatex (Arkema), Efka 770 1, Efka 7731, Efka7732 from BASF. Ionic dispersing agents include, for example, SLS (sodium lauryl sulfate), CTAB (cetyltetraammonium bromide), AOT (dioctylsulfosucinate) and fatty acid such as oleic acid. Conventional particle ink is readily available such as commercial SunTronic Jet Silver U6503, from Sun Chemicals Ltd. (485 Berkshire Av, Slough, UK). 15

The foregoing dispersing agents may be found in an amount ranging from 1 to 10 weight percent of the model particles. The exact amount of the dispersant, depends on the dispersing power of the agent and the quality of the mixing tool, and also on the attaching property of the dry material. These can all affect the resulting ink properties, such as viscosity.

Removal of the dispersing agent. The dispersing agent should also be such that it may be removed from the printed object prior to or during any desired post processing stage, and specifically during heat treatments to the printed object, such as pre-sintering or sintering. Partial removal of the dispersant may take place during printing in the printer hot environment. In that case partial sintering takes place and replaces the binding power of the dispersing agent. A more detailed discussion of the various issues associated with sintering is provided below.

Surface modifiers. Surface modifiers are substances that influence properties such as surface tension, scratch resistance and interface attributes with the printed object. Exemplary surface modifiers include cellulosic polymers such as ethyl cellulose, carboxymethyl cellulose, hydroxypropyl methyl cellulose, cellulose acetate. Other surface modifiers may include polybutyrals (from Butvar). As discussed in more detail below, surface modifiers create desired characteristic to the finished model such as adding color or abrasion resistance. Surface modifiers may also improve processing of the printed object, such as facilitating the separation of the support from the model or providing a barrier between the support and the model to reduce cross contamination.

When present in the support ink, the surface modifiers may be from approximately 0.1 to approximately 5 weight percent of the support ink, depending on the desired ink properties, such as viscosity.

Additives Used as Modifiers. As used herein, "additive" refers to material that is added to the ink to assist printing the target particles or harden the green part or prevent adverse phenomena during the printing and sintering process. In various embodiments, one or more additive materials may be added to the ink in order to assist in the processing of the final product, such as the printing or sintering step, or in the properties of the final object, such as the color or mechanical properties of the printed object. In one embodiment, there is at least one separate printing head dedicated to dispensing the additive alone or the additive dissolved in an appropriate solvent. As used herein, this head, which is used to deposit a material other than the model or support, is referred to as the "additive head." In this case there is no issue of dissolving the additive in the target ink that may not be compatible with the additive. In addition, the use of an additive head makes it possible to dispense different amounts of additive in different zones of the object.

Additives Used to Color to the Model Surface. In various embodiments, one or more additive materials may be deposited on the surface of the printed object to impart a desired color. For example, one zone that may benefit from an additional or excess use of additive is the periphery area of the model. The additive may be a specific color that is required only at the periphery.

System For Forming a Product with Differing Size Particles

In one embodiment, there is described a system for forming a product with differing sized particles. This system comprises at least one print head region configured to retain a first group of print heads configurable to additively print at least a first portion of the product with a first material having a first average particle size, wherein the first average particle size is chosen to impart a first structural characteristic upon sintering. In an embodiment, the first portion comprises the core or essential part of the printed product. For example, if a prosthetic tooth is printed, the core or essential part of the printed tooth would comprise the core of the tooth, as opposed to the outer layer(s).

This system also comprises at least one second group of print heads configurable to additively print at least a second portion of the product with a second material having a second average particle size, wherein the second average particle size is chosen to impart a second structural characteristic that differs from the first structural characteristic upon sintering. In an embodiment, the second portion comprises periphery part of the printed product. For example, if a prosthetic tooth is printed, the periphery part of the printed tooth would comprise the outer layer(s) of the tooth, as opposed to the core structure.

In one embodiment, the first material and the second material are substantially the same, such as the same chemical or crystal structure, other than having differing average particle sizes and differing sinter temperatures. In another embodiment, the first material and the second material are substantially different, such as having different chemical and/or crystal structures, from one another but have substantially the same sintering temperature.

This system further comprises at least one processor configured to receive information reflective of desired properties of the product and regulate the first group of print heads and the second group of print heads to unevenly distribute the first material and the second material in a layer-by-layer basis to impart differing structural characteristics to differing portions of the product based on the information reflective of the desired properties of the product. In an embodiment, the at least one processor is configured to determine a distribution of the first and second materials in order to achieve the desired properties of the product.

As used herein, "interlace" means interspersed with one another, such that the first material and the second material are co-mingled to form a unitary structure upon deposition rather than segregated in different parts of the product. It is appreciated that the unitary structure may include different amount in terms of weight or volume of the first material and the second material. For example, the proportion between the different material throughout the interlacing varies in different portions of the product according the desired properties of the product. In an embodiment, the print heads do not randomly interlace the first and second materials but deposit such material to achieve a certain effect. For example, the at least one processor may be configured to cause the first group of print heads and the second group of print heads to digitally interlace the first and second materials with each other in order to achieve a printed product having desired properties.

In an embodiment, the system described herein deposits the materials such that at least one of the two materials wicks into the other material. In this embodiment, wicking the first material into the second material, or vice versa, causes one or more strings to form, such as a web of strings to form in the printed product.

The desired properties may be achieved by altering the amount and/or distribution of the first and second materials in each layer. For example, the at least one processor may be configured to determine a distribution of the first and second materials such that in a first layer comprises more first material than second material, and the second layer comprises more second material than first material. Altering the amount and/or distribution of the first and second materials in each layer allows for the printing of a first portion that includes a core of the object, and the at least a second portion that includes a periphery of the object.

Typical desired properties of the product that can be altered or imparted include thermal, mechanical, chemical or physical properties. Non-limiting examples of thermal properties include sintering temperature, thermal expansion coefficient, shrinkage coefficient, thermal conductivity, and thermal diffusivity. Non-limiting examples of desired mechanical properties include abrasion resistance, brittleness, ductility, elasticity, stiffness, toughness, and yield strength. Non-limiting examples of physical properties include density, hardness, and color. Non-limiting examples of chemical properties include stability, corrosion resistance and oxidation resistance. As used herein, chemical "stability" means the material is not particularly reactive in the environment or during normal use. For example, the material may be considered stable if it is inert to air, water, moisture, heat, solvents, etc under the expected conditions of application. Likewise, the material may be considered unstable if it can corrode, decompose, polymerize, burn or explode under the conditions of anticipated use or normal environmental conditions. Any combinations of the foregoing can be imparted into the printed product by alternating the first and second materials, and the amounts of each.

As previously described, the desired property of the product may encompass a variety of chemical or mechanical properties, with specific mention being made to shrinkage coefficient of the product or even just certain parts of the product. In an embodiment, it may be desired to reduce or eliminate dimensional shrinkage between the printed model part and the printed support, such as by adjusting at least one of sintering temperature and shrinkage coefficient. In one embodiment, the difference in dimensional shrinkage between the printed model and the printed support is less than 15%, such as less than 10%, or less than 5%.

In an embodiment, at least one of the support ink or the model ink comprises solid particles having a chemical composition, a particle size, a particle size distribution, or a combination thereof, that causes the printed model part to sinter at a temperature lower than the support material. For example, in one embodiment, the printed model part sinters at a temperature of at least 100° C. below the temperature of the support structure, such as at least 150° C. or even at least 200° C. below the temperature of the support structure.

The particle size, particle size distribution, or a combination thereof, of the solid particles in the support ink and model ink, may be modified to allow the printed model to sinter at a temperature lower than the temperature of the support material. For example, the particle size of the solid material in the support ink is larger than the particle size of the solid material in the model ink. In an embodiment, the particle size of the solid material in the support ink is 1.0 micron or more, and the particle size of the solid material in the model ink is 0.5 micron or less. In an embodiment, the support ink comprises solid particles having a mono-modal particle size distribution and the model ink comprises solid particles having a multi-modal particle size distribution. Likewise, the support ink may comprise solid particles having a packing density lower than the packing density of the solid particles for the second ink.

As previously described, inks that can be used according to the present disclosure include one or more support inks for ink jet printing a support structure comprising one or more solid particles of an oxide or carbonate of metals and metalloids, such as silicon, aluminum, titanium, yttrium, cobalt, copper, iron, zinc, magnesium, zirconia, combinations or alloys thereof; and a model ink for ink jet printing a model part, wherein at least one of the support ink or the model ink exhibits properties to reduce or eliminate difference in dimensional shrinkage between the printed model and the printed support. In an embodiment, the one or more solid particles of an oxide or carbonate of the support ink comprises $SiO_2$, $Al_2O_3$, $TiO_2$, $Y_2O_3$, CoO, CuO, ZnO, MgO, $ZrO_2$, $FeCO_3$, and combinations thereof.

In an embodiment, the model ink comprises solid particles made from metals selected from iron, copper, silver, gold, and titanium, metal oxides selected from $SiO_2$, $TiO_2$, $BiO_2$, metal carbides selected from WC, $Al_4C_3$, TiC, metal alloys, selected from stainless steel, and titanium-based composites.

In an embodiment, at least one of the support ink or the model ink further comprises an additive chosen from a dispersant, a rheological agent, a binder, or combinations thereof, wherein said additive is found in an amount sufficient to control the voids between solid particles contain in the inks.

In an embodiment, the print head region of the described system is configured to retain a third group of print heads. This third group of print heads is configurable to additively print a removable support material for temporarily supporting the first and second printed materials. As mentioned above, the one or more additive materials may be added to the ink in order to assist in the processing of the final product, such as the printing or sintering step, or be printed from a separate head, to improve the properties of the final object, such as the color or mechanical properties of the printed object.

Method of Forming a Product with Different Size Particles Using the Disclosed System(s)

There is also disclosed herein a method of making a product by ink jet printing using the described system. For example, the method of making an object by ink jet printing described herein may comprise jetting object material including particles to form a product structure having a first sintering temperature. Simultaneous with or prior to forming the product structure, the method further comprises jetting support material including particles, to form a support structure, wherein the support structure is jetted in a manner supporting the product structure. In an embodiment, the support material has a sintering temperature that is greater than the sintering temperature of the object material. The jetted object and the jetted support together constitute a green part. The method further comprises heating the green part to a temperature at or above the first sintering temperature and below the second sintering temperature to thereby at least partially sinter the jetted object without substantially sintering the jetted support and removing the substantially unsintered support from the at least partially sintered object.

As used herein "substantially unsintered" means the support particles remain substantially discrete or easily separated if there is some attachment between particles, as long as support particles have not yet fused together to form a dense solid piece.

As mentioned, the one or more solid particles that can be used herein, and specifically for the disclosed method comprises $SiO_2$, $Al_2O_3$, $TiO_2$, $Y_2O_3$, CoO, CuO, ZnO, MgO, $ZrO_2$, $FeCO_3$, and combinations thereof. Similarly, the model ink that can be used in the disclosed method comprises solid particles made from metals selected from iron, copper, silver, gold, and titanium, metal oxides selected from $SiO_2$, $TiO_2$, $BiO_2$, metal carbides selected from WC, $Al_4C_3$, TiC, metal alloys, selected from stainless steel, and titanium-based composites.

The method further comprises sintering the printed model at a temperature lower than the sintering temperature of the support material, such as sintering of the printed model occurs at least 100° C. lower than sintering temperature of the support material.

In an embodiment, sintering may be carried out in a single step, in multiple steps, or through the use of a laser. When sintering occurs using a laser, laser sintering further includes at least one external energy source in combination with the laser, such as by an external energy source comprising microwave energy, plasma energy, or high energy lamps.

In an embodiment, the method further comprises heat treating the green object to at a temperature and for a time to form a partially sintered model having a density ranging from 70 to 85% of theoretical density.

Additive Used to Change Surface Properties. In an embodiment, the method further comprises adding at least one additive to the support or the model, wherein the additive is deposited with the support ink or with the model ink, or is deposited using a separate printer head. The additive may be deposited with the separate printer head onto the surface of the model to change at least one property of the final model, wherein said at least one property in selected from the color or the mechanical properties of the printed object. For example, the additive deposited on the surface of the model may form at least one abrasion resistant layer comprising a metal or polymer. Non-limiting embodiments of the metal comprises cobalt, titanium, tungsten and carbides thereof, and the polymer comprises a sol-gel derived silica and hybrid films from tetraethoxysilane (TEOS) and 3-glycidyloxypropyltrimethoxysilane (GLYMO).

In an embodiment, the additive may comprise a polymer that will form a composite with the finished model, and is added to printed model material, either during printing by adding it to an ink or by capillary action afterward via an infiltration method. For example, the polymer may comprise a polyaniline alcohol (PAN) and the printed model comprises a metal carbide.

In an embodiment, the method further comprises forming an interface layer between the support material and the model material, the interface layer comprising a combination of the support material and the model material. For example, the interface layer comprises $FeCO_3$.

In an embodiment, the method further comprises removing the support structure from the model material by at least one mechanical, chemical or thermal treatment step.

Figure 3:
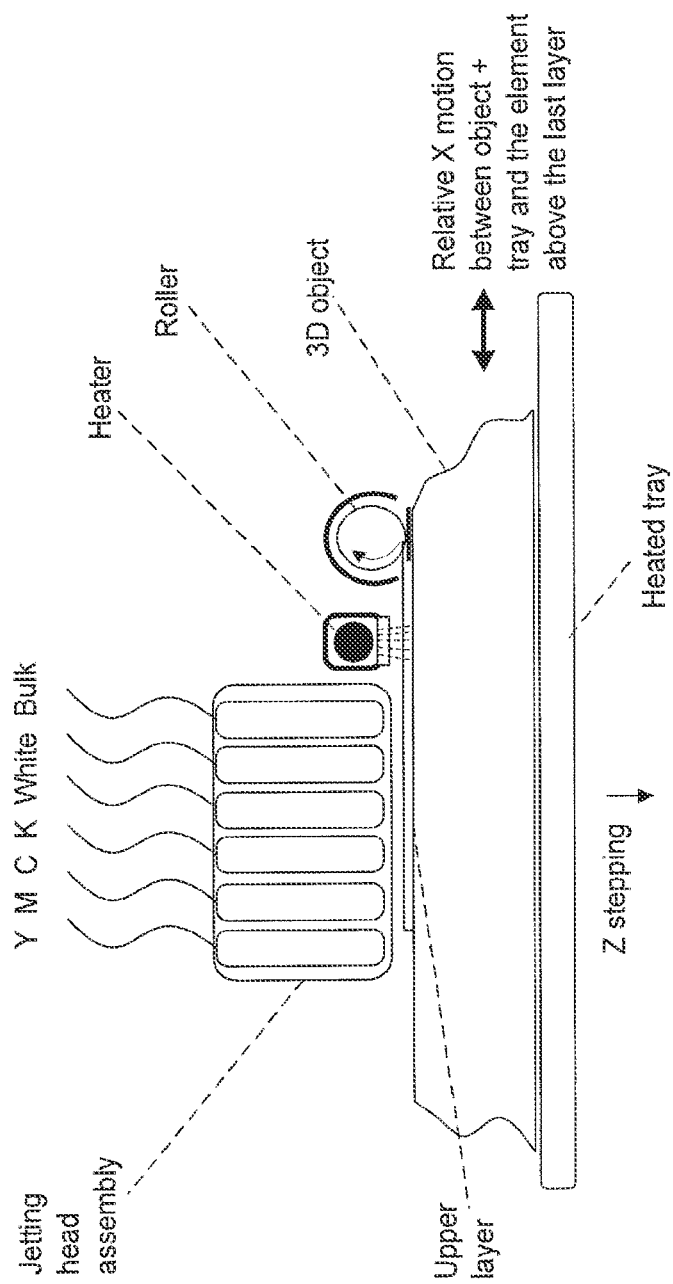
FIG. 3 depicts a printer head assembly according to an embodiment of the disclosure comprising a plurality of tint heads that allows the printing of color inorganic objects by inkjet printing.

As previously described, the additive head assembly may comprise several heads, which are shown in FIG. 3, or alternatively a head that receives and jets several ink types. The inks required for this head assembly may comprise several ink types that are stored in respective several ink tanks and piping.

System and Method for Making a Tinted Printed Part

Figure 4A:
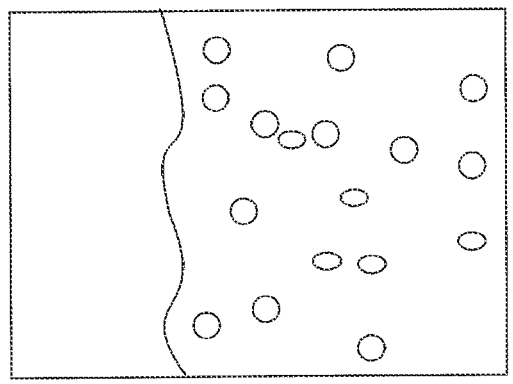
FIGS. 4A-4C depict an ink dispersion according to an embodiment of the disclosure comprising colorant particles, e.g., pigments, or pigments mixed with structural particles, such as zirconia (FIG. 4A), or pigments embedded in the zirconia particle (FIG. 4B).
Figure 4B:
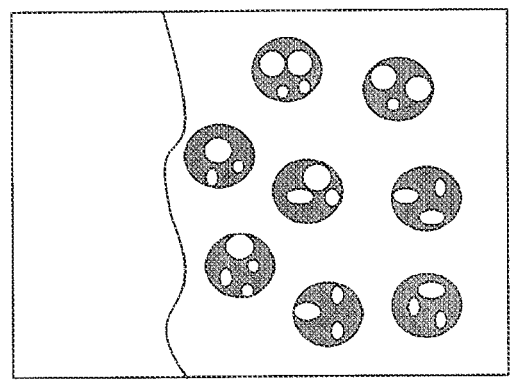
Figure 4C:
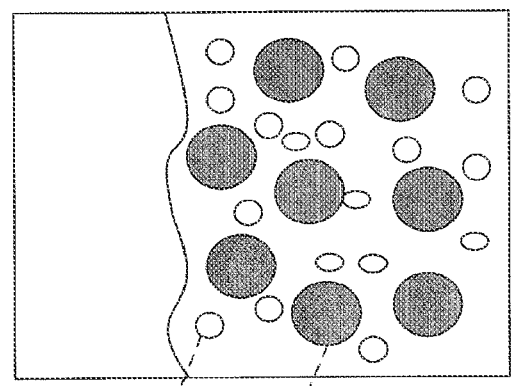

In one embodiment, the inks should optionally comprise ink for the bulk material, which is a structural ink, white ink, and tinted inks. As shown in FIG. 4, the inks should comprise a dispersion of solid particle in a carrier liquid, with a possible exception of a tinted ink that comprises a dissolved colorant in a solvent. By way of example, and as shown in FIG. 4A, in one embodiment, the ink of the bulk may comprise a zirconia dispersion in a carrier liquid. The tinted inks may comprise zirconia mixed with yellow, red and blue inorganic pigments. With reference to FIG. 4A, the ink dispersion may comprise colorant particles (pigments), or pigments mixed with structural particles (zirconia), or pigments embedded in the zirconia particle, as shown in FIG. 4B.

Figure 5:
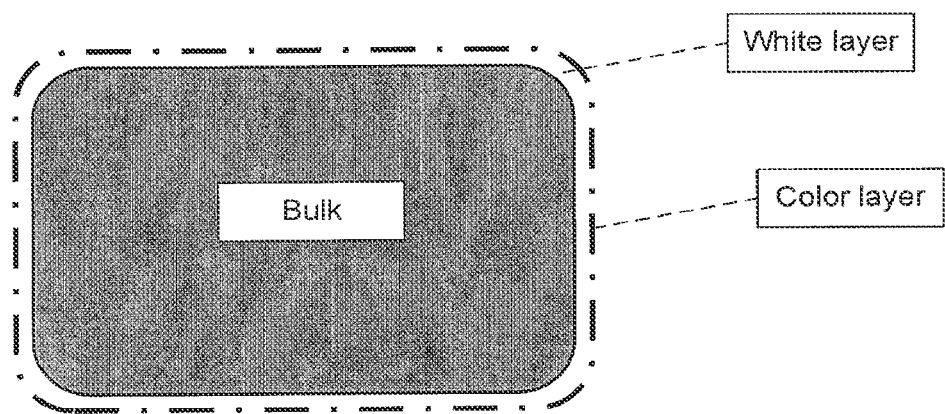
FIG. 5 depicts a colored cube with a white layer below the color layer made according to an embodiment of the disclosure.

In another example, the bulk material may comprise steel, the white ink comprises zirconia, and the tinted inks comprise the four CMYK inks used in color printing: cyan, magenta, yellow and key (black). In this embodiment, the CMYK particle pigments may be mixed with glass particles, wherein the glass particles form a glossy transparent coating when sintered. With reference to FIG. 5, the roll of the structural particles in the tinted ink dispersion is used to produce proper solid volume proportion in the ink as required for attaining the same layer thickness of the tinted area versus the bulk area. In this embodiment, the structural particles can be regarded to as fillers.

In one embodiment, the method of adding color to the model surface comprises:

Creating or receiving a 3D digital representation of the required object, comprising the shape and the surface color of the object. The color may vary from point to point on the surface, and may be expressed in Munsell color system (Hue, Chroma, Lightness), CIE XYZ (Tristimulus values) or CIELAB (a*, b*, L*) or in numbered code system, or other color systems;

Separating the color into the set of available ink tints in the printer (CMYK subtractive system tints, or spot colors, or others);

Calculating the number and relative proportions of tinted pixels composing any color spot on the surface of the object;

Digitally assigning the respective tints to pixels close to the object's surface, as shown in FIG. 5;

Determining the orientation of the object on the substrate during printing, and digitally adding the require support structure;

Slicing the digital object;

Printing the object layer (slice) by layer, while the respective heads jet according to the ink type assigned to the respective pixels. It should be noted that the thickness of the layer in the tinted area at the periphery should be similar, and in some cases, identical to that of the bulk of the layer. The printed object is called "green object"; and Firing the green object in an oven until complete sintering of the object material.

In an alternative embodiment when the bulk material comprising the object is not white, the method comprises adding a white layer at the periphery of the object under the tinted pixels. When saturated color is required, or when the color vary from spot to spot on the object's surface, it is desired that at least a layer behind the color layer should be white (FIG. 5). It may also be imperative that the structural particle in the tinted ink (if any) is transparent.

In one embodiment, the tints comprise inorganic colorants (pigments) that are compatible with the firing temperature of the object during sintering. In addition, the tinted ink may comprise colorant or colorant mixed with building material. The building material can be identical to that of the bulk, such as a zirconia, or different. For example, if the bulk comprises steel, the tinted ink comprises glass.

In the case in which the tinted outer layer comprises different material than the bulk, such as the bulk is metal and the tinted layer is ceramic, the size of the particles that comprise the ink may be adjusted so that the sintering temperature of both materials is identical within a required tolerance. When the tinted ink comprises glass particles, wherein glass comprises a homogenous mixture of various oxide molecules, the very composition of the glass may be formulated to the same sintering temperature as that of the bulk. For example, the glass may be formulated by adding a small amount of lead oxides to silica material reduces the sintering temperature of the silica from 1600° C. to 1300° C.

In one embodiment, the printing tint inks and structural ink are in the same color pixel in order to assure uniform layer thickness over the entire layer. In addition to, or instead of the tinted inks, a transparent shiny ink can be deposited after sintering to add gloss to the manufactured object.

System and Method for Making a Tinted Prosthetic Part

The described process may benefit the dental industry, for example, to fabricate artificial teeth. In an embodiment, the normal colors of artificial teeth or crown, are dull, such as grayish white or brownish white. To match such colors, artificial teeth or crowns can be printed using the disclosed methods, such as by using zirconia based inks, while the tinted inks comprise pigments mixed or embedded with zirconia. In one embodiment, there is described an artificial tooth or crown that is fabricated using the disclosed process, and colored as described herein, and graphically represented in such as in FIGS. 3 to 5.

System for Making a Prosthetic Tooth. In view of the foregoing, there is also described a system for additively manufacturing a bodily implant or prosthetic, such as a prosthetic tooth portion. In the simplest embodiment, the system comprises at least one print head region and at least processor. The print head region is configured to retain a first group of print heads configurable to additively print, from a first ink with metal particles, a three dimensional metal core and a second group of print heads configurable additively print, from a second ink with ceramic particles, a ceramic outer coating surrounding the metal core. In addition, the at least one processor is configured to receive instructions for printing a customized prosthetic tooth portion to be constructed of metal and ceramic. The processor is further configured to control the first group of print heads and the second group of print heads such that the first group of print heads additively prints the three dimensional metal core in a printing area and concurrently with the second group of print heads additively printing the ceramic outer coating in the printing area.

In an embodiment, the received instructions include three-dimensional data representing an entire actual tooth and the at least one processor is configured to accurately reproduce the actual tooth. For example, in an embodiment the processor is configured to control distribution of the first group of print heads and the second group of print heads such that the ceramic outer coating of the prosthetic tooth portion has the same dimensions as the entire actual tooth.

In addition, the at least one processor can further be configured to control the first group of print heads and the second group of print heads such that a height of the metal core is higher than height of the ceramic outer coating.

Furthermore, the at least one processor may further be configured to control the first group of print heads and the second group of print heads such that the metal core has a threaded metal portion that protrudes from the ceramic outer coating.

The described processor enables flexibility in printing the various materials described herein. For example, the processor can configure the print heads to print metal and ceramic in the same or in separate, distinct layers. In an embodiment, the at least one processor is further configured to print a layer of the ceramic outer coating corresponding with a layer of the three dimensional metal core before a subsequent layer of the three dimensional metal is deposited. In an embodiment, the at least one processor is further configured to cause the first group of print heads and the second group of print heads to digitally interlace the metal and the ceramic with each other.

There is also described an additional print head that can be used to print the threaded portion of the prosthetic tooth. In this embodiment, the at least one print head region is configured to retain a third group of print heads configurable to additively print a removable support material for manufacturing the threaded metal portion.

There is also described a method of printing a ceramic layer after the metal has solidified. In this embodiment, the described system may further comprise a heat source configured to provide heat in the printing area to solidify a recently deposited ink, wherein the at least one processor is further configured to print a layer of the ceramic outer coating corresponding with a layer of the three dimensional metal core after the layer of the three dimensional metal core became at least partially to solidified.

To avoid thermal induced stress issues, the metal core and ceramic outer coating layer share the same or substantially the same sintering temperature. As previously described, this may be accomplished by manipulating the particle sizes of the inks used to print the various portion of the final product, such as by using different particle sizes for the metal and ceramic materials. In one embodiment, the average particle size of the ceramic particles may be greater than the average particle size of the metal particles, to allow the metal core and the ceramic outer coating to substantially share a sintering temperature or shrinkage coefficients.

The processor used in this embodiment receives instructions that include three-dimensional color information about colorization of the prosthetic tooth portion. In addition, the processor is configured to cause a plurality of print heads to print the ceramic outer coating such that varying colors are deposited, on a pixel by pixel basis, to simulate a color distribution of the actual tooth. In one embodiment, the plurality of print heads are configured to print ceramic in differing colors, and wherein the at least one processor is further configured to control deposition of the ceramic in differing colors according to the three-dimensional color information. For example, the plurality of print heads are configured to print non-structural pigments, wherein the at least one processor is further configured to control distribution of the non-structural pigments on the ceramic outer coating according to the three-dimensional color information, as the previously described CMYK inks.

In an embodiment, the plurality of print heads described herein may further be configured to deposit material that provides a mechanical or aesthetic improvement. For example, in an embodiment the plurality of print heads is further configured to deposit for providing a glossy transparent coating after sintering, such as by depositing a glass on the surface of the prosthetic tooth.

With further reference to the system for manufacturing a prosthetic tooth portion, there is described an interface for receiving three-dimensional data representing an actual tooth. In an embodiment, the three dimensional data includes three-dimensional color information representing actual coloring of the tooth. The described system includes at least one print head region configured to support at least a first group of print heads configured to jet a first material of a first color in a carrier liquid, at least a second group of print heads configured to jet a second material of a second color in a carrier liquid. In one embodiment, the system further comprises at least a third group of print heads configured to jet a third material of a third color in a carrier liquid. The at least one of the first material, the second material, and the third material is structural such that additive jetted layers are capable of forming the prosthetic tooth portion.

The system described herein further comprises at least one processor configured to access the three-dimensional data including the three-dimensional color information. The three dimensional color information is used to generate a digital rendition of color distribution of the tooth portion, the digital rendition constituting instructions for controlling the at least a first group of print heads, the at least a second group of print heads, and the at least a third group of print heads to digitally simulate color distribution of the actual tooth in the jetted prosthetic tooth portion.

The at least one processor may further be configured to control the first, second and third groups of print heads to jet the prosthetic tooth portion. In this embodiment, the processor allows a mixture of colors from the at least a first group of print heads, the at least a second group of print heads, and the at least a third group of print heads simulates a color distribution of the actual tooth. In one embodiment, the printed prosthetic tooth portion has a metal core digitally interlaced with a ceramic outer coating. It is appreciated that any or all of the first, second and third materials include a ceramic, such as the ceramic materials described herein. In another embodiment, the second and third materials may substantially comprise non-structural pigments, as also previously described herein.

Method of Making a Prosthetic Tooth Using the Described System. There is also described a method for additively manufacturing a prosthetic tooth portion. In one embodiment, the method comprises providing a first group of print heads configurable to additively print from a first ink with metal particles, a three dimensional metal core. The method further comprises providing a second group of print heads configurable additively print, from a second ink with ceramic particles, a ceramic outer coating surrounding the metal core.

In another embodiment, the method comprises receiving instructions for printing a customized prosthetic tooth portion to be constructed of metal and ceramic and controlling the first group of print heads and the second group of print heads such that the first group of print heads additively prints the three dimensional metal core in a printing area and concurrently with the second group of print heads additively printing the ceramic outer coating in the printing area.

Third Print Head for Printing Additives to Improve Final Product Properties.

As mentioned, one or more additive materials may be added to the ink in order to assist in the processing of the final product, such as to improve the properties of the final object. Non-limiting examples of the properties that can be improved include the color or mechanical properties of the printed object.

Adding An Abrasion Resistance Layer to the Model Surface. While an abrasion resistant layer can be described in the context of a prosthetic tooth or orthopedic implantable and various industrial parts, that use is only exemplary and neither limiting nor exclusive. A wide range of printed products in addition to prosthetic teeth may benefit from an abrasion resistant layer. In one embodiment, the additive head may be used to deposit an additive material that increases the abrasion resistance of the resulting object. The Inventors have discovered that an abrasion resistant layer may be achieved by integrating additives to the printed model material. Non-limiting examples include adding WC to stainless steel, $WS_2$ or C60 to stainless, or using a WC/Co matrix. In one embodiment, WC or $WS_2$ may be added as a third phase to a matrix to reduce friction and wear resistance of the resulting product. In addition, $WS_2$ can be added to printed material to improved lubrication, adhesion, fracture toughness and strain energy release rate. In one embodiment, the additive head may print a material comprising a dispersion of cobalt particles that is added to a dispersion comprising tungsten carbide.

In another embodiment, the abrasion resistant layer may comprise a composite of epoxy/sol-gel. To deposit these materials, sol-gel or epoxy combined with sol-gel raw material is printed on the surface of the printed object. These materials will harden at 100-200° C. when they lose solvent. In one embodiment, these materials will become ceramic-like when exposed to additional heating under specific condition. While not being bound by theory, such conditions typically result in weight loss of the sol-gel, likely in few thermal regions. For example, up to about 250° C., a first evaporation occurs of solvent that is less strongly chemically bonded of water molecules on the sol-gel matrix. Additional decomposition/pyrolysis of the bridging organic groups/chains occurs around 300° C. and continue up to 650° C. Above 500° C. there is the beginning of the formation of 3D Si—O—Si network via condensation reactions, which will result with silica coating.

The GLYMO-TEOS combination described herein can be used alone, or with additives to hardening it more such like cross-linking agents (PVP). The Inventors have discovered that these materials are desirable in the disclosed method because the polymer is relatively easy to jet by ink jet technology, and the environment in conducive to a desired end product. In one embodiment, the process include jetting these polymers on the hot surface of the printed object, which facilitates curing and hardening. The result is the formation of coatings that are dense, transparent and scratch-resistant.

Procedures for preparing these polymer-type materials are described in Wu et al., *A Study Towards Improving Mechanical Properties of Sol-Gel Coatings for Polycarbonate*, Thin Solid Films, Volume 516, Issue 6, 2008, Pages 1056-1062, which is incorporated by reference herein.

Adding Barrier Between Model and Support. In another embodiment, the additive head may be used to deposit an additive that creates a buffer/barrier to prevent cross contamination and/or improve support removal. This embodiment was previously described with respect to the use of $FeCO_3$ as an additive. For example, in an embodiment, $FeCO_3$ may be used as a support material for 3D printing of iron based metal alloys. As previously discussed, $FeCO_3$ is a brittle material that thermally decomposes to iron oxide and $CO_2$ at temperatures between 500-700° C. $FeCO_3$ powder can be dispersed in solution to form a jettable ink which can be deposited from inkjet print head onto a substrate in order to provide a support structure for model ink that contains iron. Besides jetting and drying, the 3D printing process involves a leveling step to reduce height variations due to build speed variations of different nozzles. The leveling step is often carried out by a roller, which can cause cross contamination between the model and the support. Thus the support material should be either removable during the thermal treatment after printing or it should be able to integrate the support contamination into the material matrix.

In one embodiment, $FeCO_3$ may be used a support material for iron and iron alloys such as stainless steels. After printing the support together with the model is placed into the furnace for thermal debinding and for $FeCO_3$ decomposition. Debinding occurs mainly at temperature below 500° C. such that the $FeCO_3$ decomposition occurs at a stage where already some open pore structure is available for the $CO_2$ to leave the printed part. The remaining iron oxide has a smaller volume and remains brittle. After the thermal decomposition the support and model part has to be cooled down to room temperature and the remaining iron oxide can be easily removed mechanically by a brush or by an air stream. After support removal the model is brought into a sintering furnace.

As stated, one advantage of $FeCO_3$ support is that contamination in the model are during the decomposition phase converted to iron oxide. During sintering in hydrogen atmosphere or in forming gas (5% $H_2$, 95% $N_2$) the iron oxide is reduced to metallic iron. Thus, the contamination is converted into a part of the model material. Due to the low concentration of the contamination the addition of a small amount of iron (≤2 weight %) is not changing significantly the stoichiometry of the model material, for example stainless steel 316, 316L, 17-4 or 314.

In one embodiment, the thickness of the described barrier/buffer layer can be in the range of 0.1-0.3 μm. In such way a mix of the support material and model material on the surface of the object can be prevented.

Forming a Composite by Supplying Additives to Model Area. In some embodiments, additives can be supplied homogenously or non-homogenously to model area, depending on the desired effect. For example, it may be desired after the printing stage, and prior to full sintering, e.g., to the green or brown part, to add another material to the open porosity of the printed object by capillary action to produce a composite material.

In one embodiment, a polyaniline alcohol (PAN) polymer may be added to printed model material, either during printing (by adding it to an ink) or by capillary action afterward via an infiltration method. This particular method uses high pressure filling and will result in a composite material having a higher strength than an object without the polymer fill. The PAN will join the sintering process and will carbonize which will produce a composite material of metal and carbon. One non-limiting example of the type of composite made using this process is shown when PAN is added to a WC printed sample. Here, the resulting composite will have a lower density and an increased elasticity, because the PAN will carbonize without losing carbon to WC.

Generally carbon fibers are made from PAN, which are organic polymers, characterized by long strings of molecules bound together by carbon atoms. The fibers produced by several process steps including: spinning, stabilization, carbonization and final treatments. Before the fibers are carbonized, they need to be chemically altered to convert their linear atomic bonding to a more thermally stable ladder bonding. This is accomplished by heating the fibers in air to about 200° C. for 30-120 minutes. This causes the fibers to pick up oxygen molecules from the air and rearrange their atomic bonding pattern. In the described process, printing is performed at 200° C., thereby eliminating the need for an additional treatment step, if PAN is used.

Sintering—Adjusting Parameters Between Model and Support

Consistent with the present disclosure, after the printing process has been completed, the object may be placed in an oven for sintering. In some embodiments, the object may be fired in the oven to a predetermined temperature until complete occurs. The sintering process can include the following firing steps:

Initial warming to burn out all organic material;
Additional warming to liquidize inorganic additives, such as cobalt, if any; and
Final heating to sinter the particles.

Some of the described heating steps can include applying vacuum, applying pressure, adding inert gas to prevent oxidation, and adding other gases that may diffuse into the material and react with it, e.g. hydrogen which assists to clean out oxygen from the body.

Sintering temperature of the particles is a function, among other things, of the particles size. A mix of nano particles and micro particles may enhance partial sintering since nano particles tend to melt in a lower temperature. This can be particularly relevant if one wants to design a model ink that will sinter at a lower temperature than the support material. By removing the dispersing agent, sintering between model particles can proceed without interference or contamination by particles of the dispersing agent. Additionally, with the dispersing agent removed, the formation of "islands" of dispersing agent particles within the printed object, which will weaken the resulting solidified, 3D structure, is prevented. Polymeric dispersants and other non-volatile compounds are typically burned or fired off, during post printing process.

In one embodiment, the present disclosure provides a mechanism in which the particle size and sintering temperatures are selected as to ensure the model sinters before the support, which facilitates support removal post sintering. This mechanism to control the sintering temperatures between the model and support materials to allow an easy removal of a non-sintered support from a sintered model is exemplified with a silica support. Silica support comprised of a homogenous large particle size.

During sintering, the sintered particles, substantially attach, filling voids located between the particles, and increasing density. The macroscopic result is a substantially contraction, e.g. between 15 to 60% volume. Thus if only one material contracts at a certain temperature, it departs from the other material and the two materials detach, and will likely lead to least one of the materials breaking. To avoid this problem, in one embodiment, the sintering temperature and shrinkage coefficients of the different materials should substantially be identical.

Sintering Temperature and Support Material. The roll of the support material is two-fold: (a) to support "negative" walls of the model and (b) to add protective envelope around the model. In one embodiment the support material is not removed from the model before sintering the model. In this embodiment, in contrast with the aforementioned requirement of combined material, the support material requires substantially different (higher) sintering temperature than the model material. Thus partial or full sintering of the model material takes place with only little or substantially no sintering of support material, allowing removing the soft or brittle or soluble support material from the rigid sintered model material without breaking the model. Again, this embodiment can be accomplished by choosing support material having high enough melting point compared to the model, or by adjusting the sintering temperature of the individual ink compositions by controlled particle size and/or particle size distribution, or by controlled degree of shape irregularity of the different materials.

An example of support per the last embodiment is an ink comprising spherical silica particles of a diameter of about 1 micron, serving as support for stainless steel ink. See a comparison between the materials in Table 1.

TABLE 1

| Material | Melting temp. (° C.) | Particle size distribution (nm) | Particle shape | Serve as |
| --- | --- | --- | --- | --- |
| Stainless steel | 1350 | 10-500 | Irregular, sharp edges | Model |
| Silica | 1600 | 900-1000 | Spherical | Support |

Figure 6A:
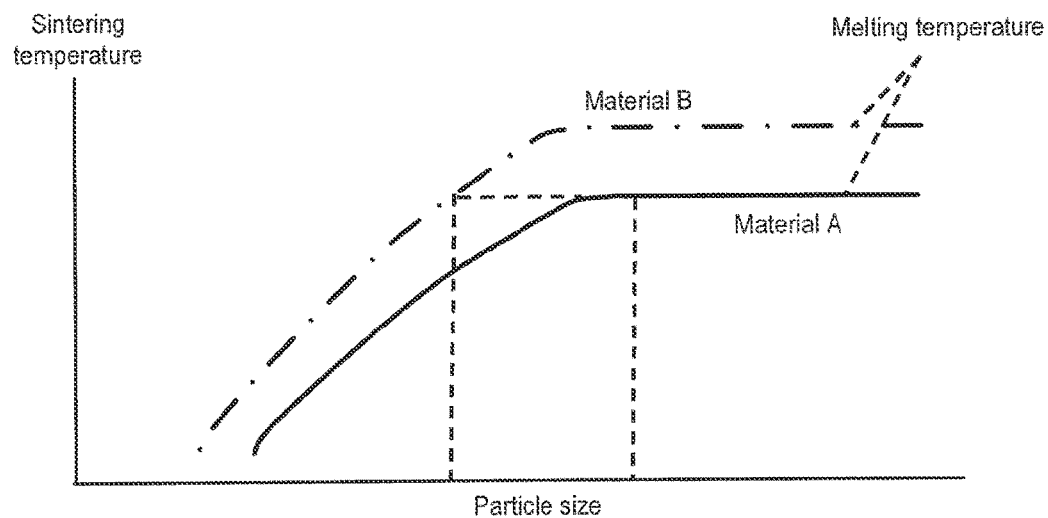
FIG. 6A is a graph depicting the sintering temperature of a material versus particle size.
Figure 6B:
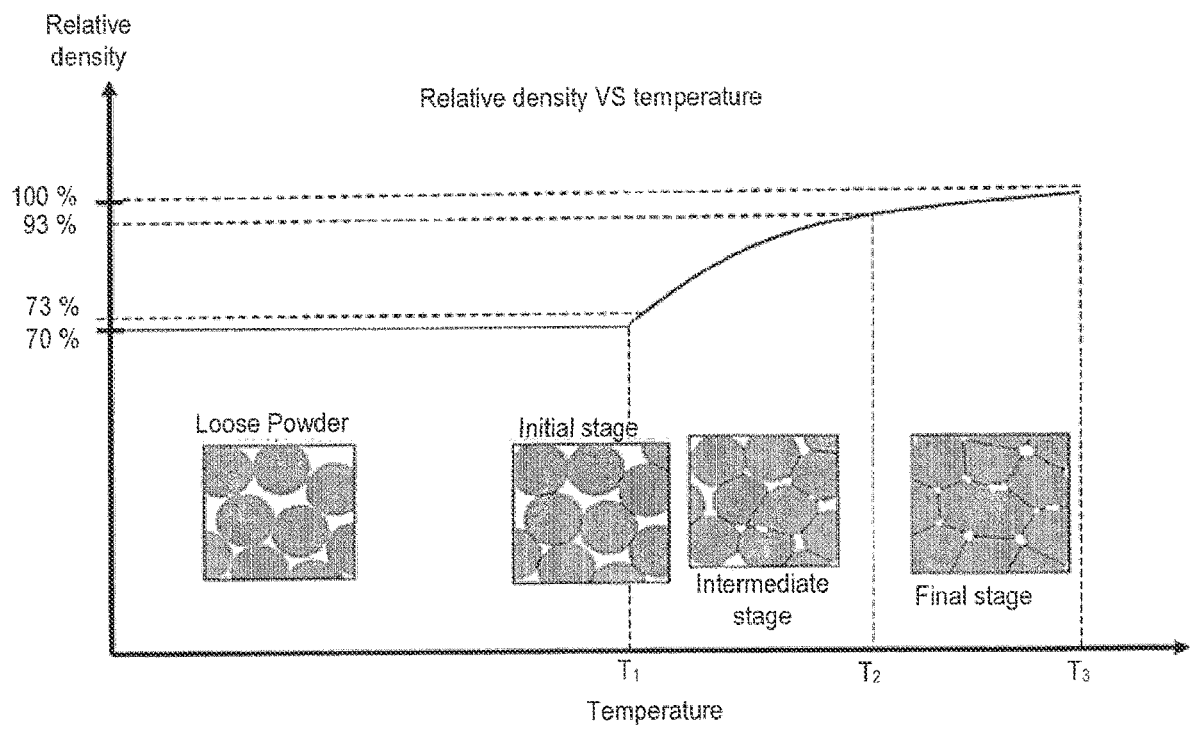
FIG. 6B is a graph depicting relative density of the four sintering stages versus sintering temperature that is associated with a powder material.

One can see that from any aspect, the model will sinter at a temperature (roughly 1250° C.) well below the sintering temperature of the support (roughly 1560° C.). As shown in the above Table, the sintering temperature of particles depends on the size and chemical content of the particles. When the particle size is much smaller than 1 micron, such as smaller than 0.1 micron, the sintering temperature substantially decreases with decreased particle size. Thus when two materials, A and B, of two different melting temperatures should be sintered at the same temperature, one can adjust the particle size of at least one of the materials (e. g. material B) to get the same sintering temperature of both. FIG. 6A graphically demonstrates this idea, which depicts the sintering temperature of a material versus particle size. FIG. 6B graphically depicts the relative density of a material versus sintering temperature. In one embodiment, the model material sinters at a temperature of at least 100° C. lower than the sintering temperature of the support material, such as at least 150° C. lower, at least 200° C. lower, at least 250° C. lower, or at least 300° C. lower than the sintering temperature of the support material.

Thus one embodiment to obtain identical sintering temperature is by controlling particle size and/or particle size distribution of at least one material to obtain sintering temperature substantially similar to the other material. Another embodiment is controlling particle shape. The more regular the shape (e.g. spherical shape), the larger the sintering temperature.

Single Stage Sintering. As discussed before, in one alternative embodiment, the Inventors have discovered a method of making a printed article that is based on a large difference in sintering temperature. This allows a single heating step that is high enough to sinter the model material, but not sinter the support material. This method results in a model that has enough integrity to allow it to be removed from the underlying (and or wrapping) support structure without breaking. This embodiment takes advantage of the differences in sintering temperatures between the model and support inks.

Two Stage Sintering. Reference is again made to FIG. 6B, which is a graph showing the relative density of the multiple sintering stages associated with a powder material. In this embodiment, the support material will be removed after the model material reaches its pre-sinter stage, which is at a point where the powder particles touch each other and necking starts, but before the substantial shrinking starts. The process resembles the two-stage debinding and sintering process that is used in the MIM industry when there is a need to remove organic components from the parts before a sintering. An exemplary two stage sintering process comprises:

Removing a printed object from the printing substrate;
Placing the object with part of the support structure located thereon into a first oven, and heating the object to a temperature that begins necking between particles. This stage, which can be called pre-sintering, will also debind the object;
Cooling the object, and moving the cooled part to a cleaning port to remove the support structure from the object; and
Placing the objects into a high temperature oven for a second sintering stage. In this stage, the object is heated to achieve complete sintering.

At the initial stage of the sintering, the powder particles connect to each other and necking is formed between them. At this stage, the material is much harder and much less brittle than at the loose powder stage, but yet, almost no shrinkage occurs. Moreover, because of the low temperature, the support material does not reach the point in which it starts to sinter, so the process of removing it either by mechanical or physical or chemical means is relatively easy. Removing the support material at the pre-sintering stage allows the use of machining and handling of the part in order to fully remove the support material. It also allows the support to be removed before the sintering stage, which can prevent cracks. If the support is not removed before the sintering process, there is a possibility that the support material will start to sinter as well, causing its removal to be much harder.

It is worthwhile to comment that the desire to have no or only little difference in shrinkage between model and support materials is limited in the case of two stage sintering to the temperature range from room to the temperature of the first stage oven. In one embodiment, using a two-step process can be more economical because the long debinding process can be made in a low temperature furnace, which is relatively cheap. Leaving the expensive high temperature sintering furnace only for the quick, high temperature, sintering stage.

As discussed before, one way to assure no sintering of the support during the debinding stage is to use support materials that have larger size and more regular shape and "narrower" particle size distribution and higher melting point than the model materials. This is exemplified with the use of a support material that comprises one micron spherical silica particles to support ink comprising steel nanoparticles, as discussed earlier. Such support ink can be manufactured by a system of chemical reactions which permits the controlled growth of spherical silica particles of uniform size by means of hydrolysis of alkyl silicates and subsequent condensation of silica acid in alcohol solutions. Ammonia is used as a morphological catalyst. Particle sizes obtained in this process can be controlled to from less than 0.05 μm to 2 μm in diameter. The non-uniformity of the diameter is less than 10%.

By way of example, $SiO_2$ particles having a size about 60 nm in size (polydispersed) sinter at about 900° C. By using larger particles, for example in the micron range, the particles will sinter at 1550° C. significantly above the sintering temperature of the model part. Support comprising particles in the micron range thus, allows the model particles to sinter to form a rigid structure, but not the support particles. The differences in sintering temperatures, and resulting microstructure will allow the printed and sintered model to be removed from the support structure, without breaking.

Known wet chemistry techniques can be used to fabricate micron size $SiO_2$ particles with tailor-made properties such as controlled: geometry; porosity level; and density, e.g., hollow spheres with reduced density. Non-limiting examples of the controlled parameters that can be used control the particle size include the Si precursor nature; the water/ethanol ratio used to make the silica, the reaction time and temperature; and the pH agent type. Processes that describe the system are found in W. Stöber, A. Fink, E. Bohn, *Controlled growth of monodispersed spheres in the micron size range*, J. Colloid and Interface Sci. 26 (1968) 62-69, which is herein incorporated by reference.

Figure 7:
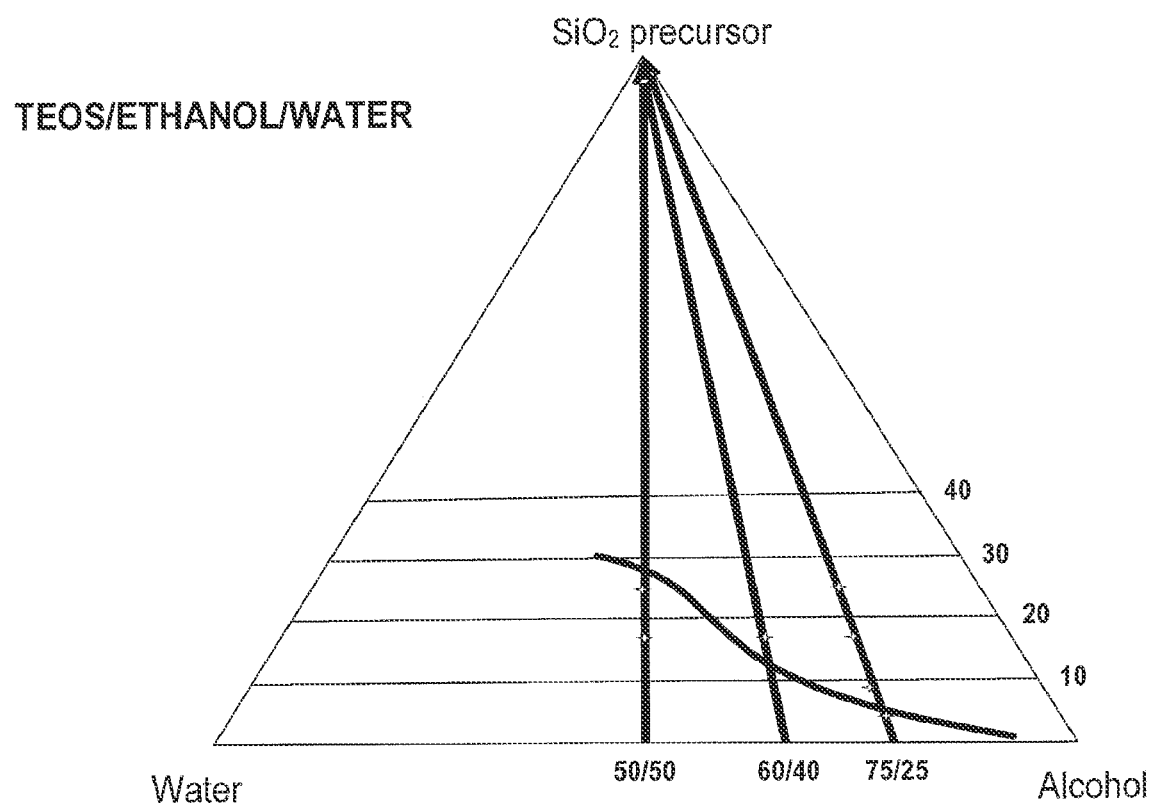
FIG. 7 is a ternary phase diagram of components used to fabricate a $SiO_2$ support ink according to the present disclosure.

To exemplify the effect of Si precursor nature, water content, and ethanol ratio on particle size for a $SiO_2$ material, the Inventors tested a number of variables within the ternary phase diagram shown in FIG. 7. The following reaction conditions were used: Temperature of 20° C., 12 hours stirring, and a pH~11.

The $SiO_2$ precursor material comprised 9 wt% $SiO_2$ content, and exhibited a viscosity: 12.2 cPs at 25° C., a density of 1.12 g/cc, and a surface tension of 32 mN/m.

Table 2 shows how particle size changed with changing ethanol/water ratios and silica content.

TABLE 2

| | EtOH/$H_2O$ ratio | $(RO)_4Si$ content (wt %) | PSD, $d_{90}$ (μm) | After Solvent Exchange (wt %) | 3 μm filtered |
|---|---|---|---|---|---|
| 100-0 | 75/25 | 3 | 0.32 | NA | NA |
| 100-1 | 75/25 | 9.5 | 0.82 | 8.7 | 7.8 |
| 100-5 | 75/25 | 24 | 30 | NA | NA |
| 100-6 | 75/25 | 17.5 | 34 | NA | NA |
| 101-3 | 50/50 | 24 | 0.70 | NA | NA |
| 101-2 | 50/50 | 17.5 | 0.58 | 20.0 | NA |
| 102-3 | 60/40 | 17.5 | 140 | NA | NA |

In-Situ Debinding and Sintering. In one embodiment, there is disclosed a method to address the issues associated with shrinkage during debinding and sintering. In particular, the Inventors have discovered an in situ debinding and sintering process that improves process throughput, to eliminate cracks in green or brown bodies and to shorten the post-printing debinding process.

In the current process, each printed layer is hardened before jetting the sequential layer. Typically the hardening can be achieved via evaporation the liquid carrier of metal ink to produce green parts. In order to evaporate the liquid carrier and fix the jetted drops in specific and accurate place, printing typically occurs on a hot surface, and additional heating used to fully evaporate the liquid carrier. The extra heating may be done by system consists of blower, lamps, light and suction.

When nanoparticles are employed in the disclosed process, the melting point of the nanoparticles typically range from about 200-400° C. Thus, sintering occurs on the substrate or previous layer by simple external energy, such as by using a heating chuck or lamp. However, when micro and sub-micron particle sizes are used, the melting point of typical metals remain consistent with the bulk material, thereby precluding sintering or even partial sintering with heating chuck or lamp. In particular, the energy flux (Watt/$m^2$) is not enough to start sintering. As a result, there is a need for high energy flux at short time frames to provide low total energy fluxes into the sample. This can be achieved by laser, microwave or flash light sintering because such systems can provide a high energy flux (Watt) within a short time, which will increase the surface temperature to appropriate sintering levels.

In one embodiment, to achieve a fully sintered part comprising micron and sub-micron metal particles, a post printing process which consists of debinding and sintering procedures, may be employed. While a laser line scanner may be used to sinter powder using an in situ process, this process is limited by a low throughput due to scanning time.

To avoid these limitations of in situ sintering, there is described herein a process to get brown or fully sintered parts after printing process. Unlike existing laser line scanning technologies, there is described herein a line scan laser or full area sintering that comprises flashlight or microwave energy. In this process, model and support where the support will not sintered due to its material properties, for example by using ceramic material for support and metal powder for model. Another example can be by using nanoparticles doping in model area. Another example can be that at least one of the support material and the object material is selected to be a doping agent for the other.

Figure 8:
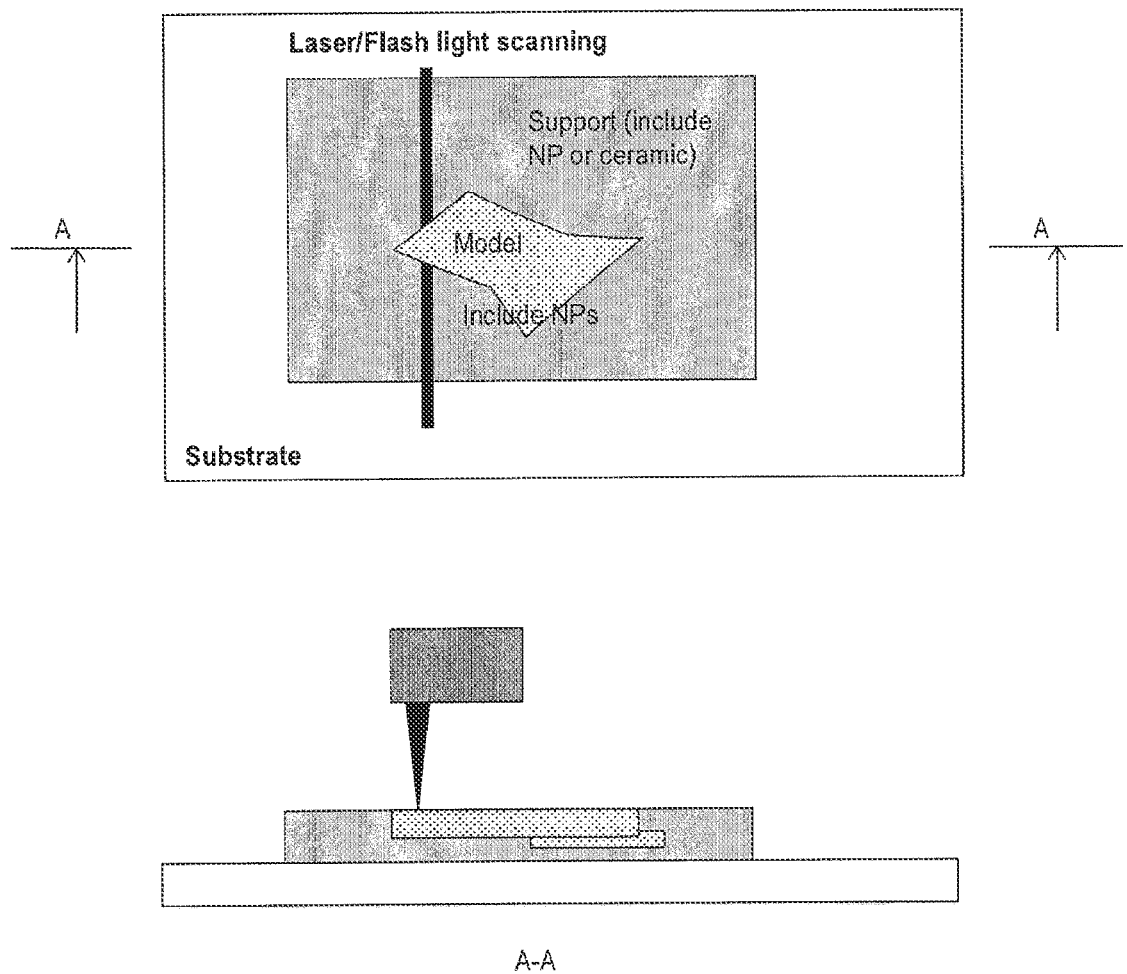
FIG. 8 show schematic illustration of in situ laser system with model and support material.

FIG. 8 is a schematic illustration of in situ laser system with model and support material according to one embodiment of the disclosure. The external energy use for sintering can be microwave; plasma produced by charge roller rolling on the sample or by flash light from high energy lamps.

In the disclosed method, direct selective heating of a printed metal ink layer occurs, which allows higher process temperatures, and thus better sintering performance in a shorter time. The proposed process is the follow: (i) printing ink and support; (ii) removing liquid carrier with low energy flux by using heat from bottom of substrate and/or by using blower with lamp system, (iii) then with laser scanner or another energy with mid-range energy flux (see spec. below) removing extra organic material and (iv) finally by using the same instrument (e.g. laser) with high energy for short time heating the particles to sinter temperature.

In one embodiment, the debinding process can be done with the laser described and exemplified herein, including with a low intensity for a longer time (process velocity up to 10 mm/sec). The debinding process goal is to remove the organic components of the printed ink by thermal decomposition, which requires heat the surface of the model to 300-400° C. Where sintering will done by high energy at short time, the sintering time should be in the range of millisecond to avoid oxidization. During sintering, metal particles start to connect with each another driven by surface energy forces. There is described a method to remove parts of the organic component followed by partially sintering to achieve the brown strength of samples. This can be followed by furnace sintering to achieve full debinding and sintering. The fast sintering in the printing process can eliminate the oxidization. However, to be sure there is no oxidation environment, an inert gas such as nitrogen, argon, or hydrogen or typical combination of these gases can be added to system. With regard to the laser used in this sintering method, there is described a line-array laser generating 808 nm wavelength, with about 10-20 KW/cm$^2$ intensity, a line width ~10-100 um, and a line length ~3-300 cm. In one embodiment, a CW or pulse laser having a typical pulse duration ~1-20 msec, can be used.

As discussed above, the sintered material substantially contracts during sintering due to consolidation associated with the removal of porosity and voids between its constituent particles. Thus if only the model sinters and contracts at a certain temperature, it delaminates from the non-contracting support material. In one embodiment, it is possible to use this delamination as a mean to remove the support from the model. This feature is useful whenever the support prevails outside the model body. In contrast, when the support is substantially surrounded by the model, this feature is not an option because the support will prevent the model to contract as required, and the model may break upon sintering.

In other words, added to the digital application of different materials on a pixel by pixel level for the above non-limiting various examples, the ability to provide one or more complementary digital heat treatments on the same pixel by pixel level to achieve a required local or bulk property such as by controlling the solidification, evaporation, necking, debinding or sintering levels of a pixel. According to this aspect, a printed pixel may be treated to become green, brown, sintered pixel or anywhere in between such as heated, debinded, necked, partially sintered or fully sintered. Since different heat treatments may provide different mechanical properties to a certain material, the ability to provide digital heat treatment on a pixel level according to aspect of the invention allows distribution of different mechanical properties across the model structure, the support structure or in the interface between them. For example, model pixels may be exposed to in-situ heat treatments which will create model areas as brown areas while support pixels may be exposed to no in-situ heat treatment or to a heat treatment which will transform these support pixels into green area. Alternatively, for example, some support pixels may be exposed to in-situ heat treatment which will make those pixels brown pixels to reinforce the support while keeping other support pixels in a green stage. According to another example, pixel in the boundaries layers between the support and the model may be exposed to in-situ heat treatment which will make them green pixels to allow easier separation between the support and the model or to reduce the sensitivity to differences in shrinkage coefficients between support and model areas and to prevent cracks. According to another example, some model pixels may be exposed to in-situ digital heat treatment to create these pixels as green pixels to operate as strain release areas in the model while other model pixels may be exposed digital in-situ heat treatment to convert these pixels into brown pixels or partial sintered pixels.

Shrinkage—Adjusting Parameters Between Model and Support

Controlling Shrinkage of Inks During Processing. In view of the foregoing discussion, and in accordance to an aspect of the present disclosure, it is an advantage to use model inks which share similar shrinkage coefficients, when different model inks are used in the same model, to form a composite or multiple components object. Such a shrinkage coefficient similarity should be in a range of temperatures along the stages of heating and sintering the part. The first substantial shrinkage takes place during de-binding, when the additives evaporate off (leaving vacuum behind), and second shrinkage occurs during sintering. In one embodiment, shrinkage is controlled by removing the support at green state or after debinding process where the shrinkage less than 3%, such as less than 2% or even less than 1%.

Shrinkage During De-Binding. In one embodiment, difference in shrinkage during the de-binding stage can be prevented by preventing shrinkage at all. This can be done by maintaining vacuum in the oven throughout the process. Due to the vacuum surrounding the part, the internal vacuum that is left behind the loss of additives does not create pressure that otherwise would cause shrinkage. A second embodiment is based on the proposition that when additives are leaving the object (e.g. by evaporation or disintegration and evaporation) the particles move towards each other until an intimate touch, and the empty volume that was occupied beforehand by the additives is thus minimized. However, not all the volume that the additives occupy vanishes, since even without the additives there is a lot of empty space between the particles at the closest structure. For example, for spherical particles of uniform radii, the empty space at the closest structure is more than 30% of the overall volume. When the particles are different from each other in size, the empty space may be smaller. In this embodiment, the amount of lost additives (e.g. organic materials) is appropriately controlled so as to have both materials shrink by the same amount during the loss of the additives. When the main part of the additive is a binder, this stage is the de-binding stage.

Shrinkage During Sintering. Before debinding the binder and other additives separate the particles from each other. After debinding the particle just touch each other at discrete points. During sintering the particle melt-like into each other so that the voids between the particles surfaces vanish, and the material thereby contracts. The amount of contraction thus depends on the amount of empty space between the particles before sintering.

In one embodiment, the particles of each material are substantially identical to each other in size and shape. This embodiment is based on the fact that the proportion of empty space to particle volume is invariant of scale. In another embodiment, there is described a size and shape distribution of both materials that is substantially identical except that the scale can be different. Another embodiment is directed to controlling the relative empty space in a material by mixing small particles with large ones so as to have the same relative empty space in both materials. This embodiment relies on the fact that small particle fill the empty space between large one, and thus decrease the empty space.

In order to prevent breakage and cracking, it may be important that the temperature at which the additives are lost is substantially the same in the different materials, so that the identical shrinkage takes place at the same time.

Controlling Shrinking with Additives. As previously mentioned, in an embodiment in which it is desired to have two or more model materials sinter at the same temperature, modification of the composition may be used to avoid issues with different shrink rates between the materials. For example, it is known that model materials may contract at different amount during sintering, since the voids between the respective particles may be different. One of the parameters that impacts the void size is the amount of lost material that is added and mixed to the particles. The lost material evaporates or disintegrates and evaporates at a temperature smaller than the particle sintering temperature. When the lost material evaporates, the particle material is left with large gaps between the particles. During sintering the particles move closer to each other and close the gaps, resulting in material contraction. Thus the contraction coefficient may be controlled by the amount of added lost material.

As previously described, different additives may be naturally included in the ink formulation, namely, dispersing material, injection improvement material, and binding material. One or more of the three materials is generally lost during the heat treatment period prior to sintering. Usually all the organic material is lost. Thus the amount or size of the voids between the particles can be controlled by controlling the amount of the added (additive) materials.

Figures 9A, 9B:
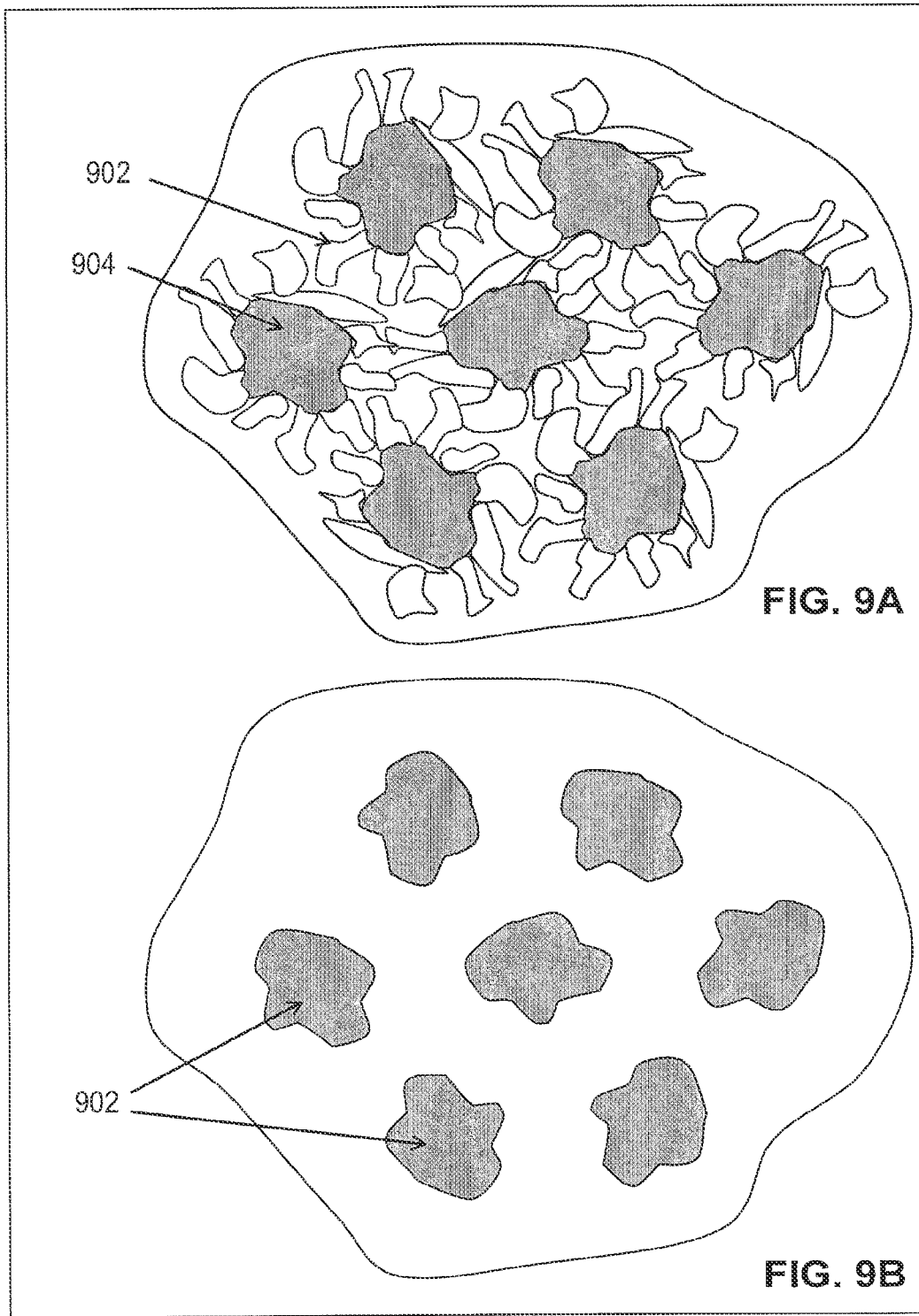
FIGS. 9A and 9B are schematics showing particle material before (FIG. 9A) and after (FIG. 9B) dispersant evaporation.

Reference is made to FIG. 9, which shows particle material before and after dispersant evaporation. FIG. 9A shows particles (902) wrapped with dispersing molecules (904) at low temperature. FIG. 9B shows particles (902) that remain after losing the dispersing molecules, which often comprises an organic material, at high temperature, but below sintering.

Controlling Shrink Rate with Packing Density. In one embodiment, the contraction amount can also be modified by varying the physical shape of the particles. For example, there is a different packing fraction (also referred to herein as "packing density") when the particle are cubic compared to spherical particles. The packing limit of spherical particles is approximately 64%. In one embodiment, a wide range and mix of particles size can be used to increase packing density to a value approaching 100%, when a particular particle distribution is chosen to allow the plurality of particles to pack to a very high packing density.

The packing factor of printed powder depends on the shape and size distribution of the particles. This is similar to packing of molecules or atoms in a crystal lattice. Typical range of packing factor for loose powder range of a single size is between 0.5-0.7. In crystal lattice, for example, packing factor is approximately 0.52 for simple atomic cube; 0.68 for body-centered cube (BCC) and 0.74 for Face-centered cube (FCC). On the other hand, if powders of various sizes are present, smaller powders will fit into spaces between larger ones.

Figure 10A:
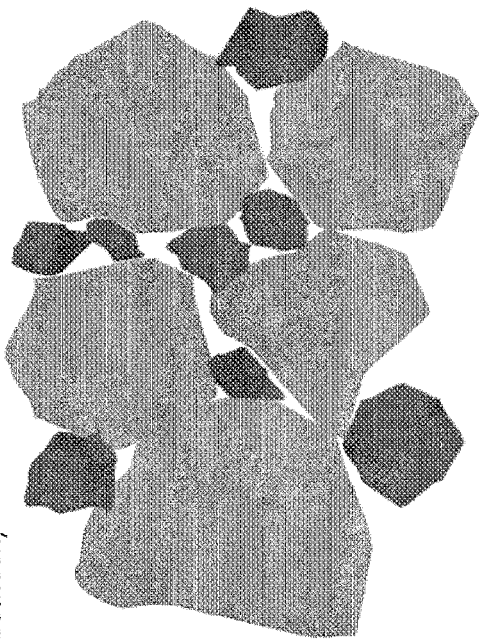
FIGS. 10A-10D are schematics illustrating the packing density of powders having various shapes and sizes, specifically showing a monosized dispersion (FIG. 10A), a multisized dispersion (FIG. 10B), monosized and multisized dispersion (FIG. 10C), and the monosized and multi-sized of FIG. 5C after heat treatment (FIG. 10D).
Figure 10B:
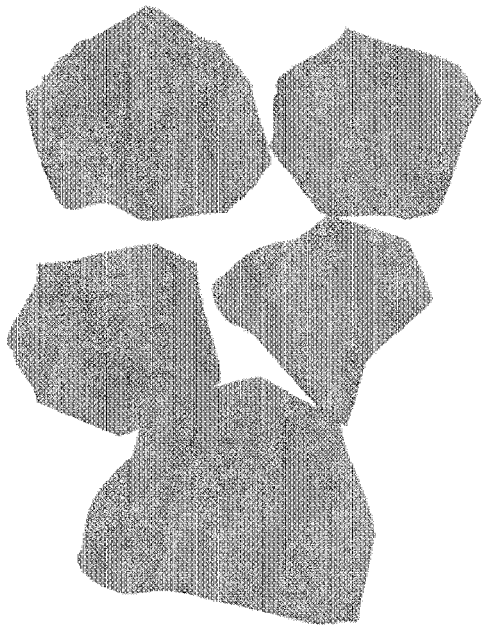

FIG. 10A shows low packing density for model powder associated with mono-sized, large particles only. In contrast, FIG. 10B shows a higher packing density for model powder associated with a multi-modal particle size distribution. In FIG. 10B, the smaller particles are able to fill the voids between the larger particles. As a result of this effect associated with the bi-modal particle size distribution, the powders have a higher packing density, which leads to the printed model having less shrinkage compared to a powder having a lower packing density. In one embodiment, the printed model will shrink less than 10% in each axis to full density. The Inventors have discovered that by controlling the particle shrinkage, packing density, and binder removal, it is possible to get low strain areas. It should be noted that per this discussion, the particle includes the solid target particle embedded in an envelope comprising the additive material, which later burns off during the debinding step.

Figure 10D:
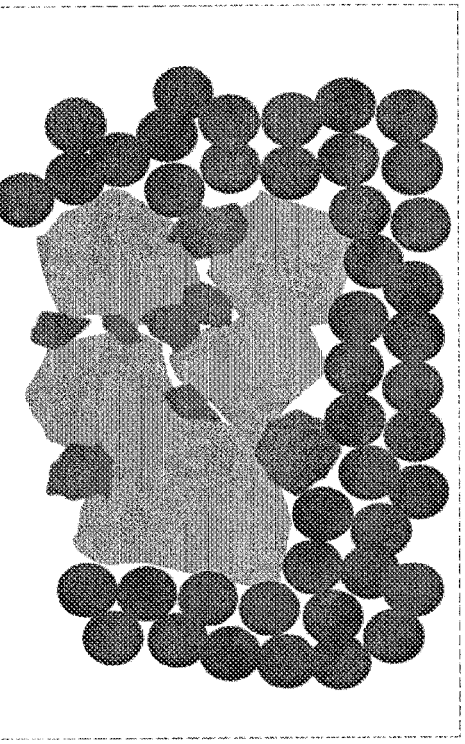
Figure 10C:
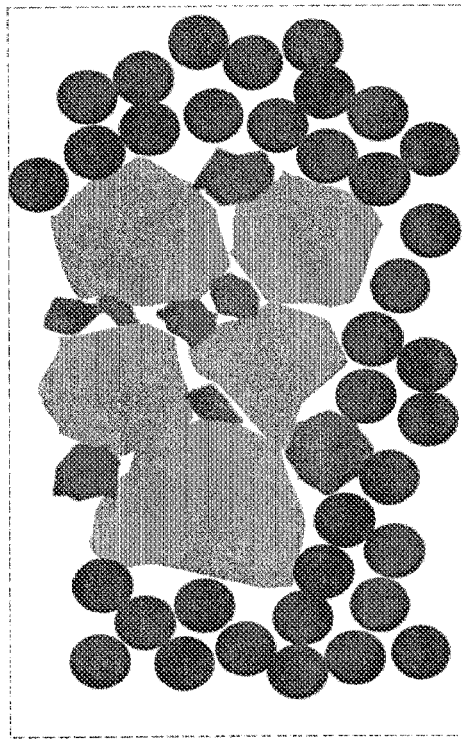

The Inventors have discovered that using different particle size distributions for the model powder and the support powder can lead to a more desirable shrinkage profile for each of the model and support areas, and lower strain areas between the model and support. In one embodiment, that is shown in FIG. 10C, there is described a model powder having a multi-modal particle size distribution, which leads to a high packing density, and a structure powder having a mono-modal particle size distribution, which leads to a lower packing density. It has been discovered that model materials with high packing density, when used in combination with support materials having low packing density will lead to a lower stress in the support during debinding. During debinding, the lower packing density associated with support material will allow the support particles to be free to move to other positions while the model shrinks since the loss of binder will lead to more free volume in the support material. For example, in one embodiment, support materials having substantially the same particle sizes (to achieve a packing density of approximately 0.5), will result in more than 50% free volume, when the binder is removed. This will release substantially all stress from model during sintering. See FIG. 10D.

In one embodiment, there is disclosed a method to neutralize shrink rate between the model and support materials in 3D printed materials. This method seeks to avoid uncontrolled separation and deformation of model parts associated with high stresses and strains because of differences in shrink rate between the support material and the model material during sintering. With reference to FIGS. 11A-11F, choosing a powder for the model ink that has a higher shrink rate than the support material will cause strain at the beginning of sintering FIG. 11A, and uncontrolled separation during sintering, which will lead to deformation of the resulting printed article FIG. 11C. On the other hand, choosing a powder for the model ink that has a lower shrink rate than the support material will again cause strain at the beginning of sintering FIG. 11B, and high compressive stresses during sintering FIG. 11D, which will again lead to deformation of the resulting printed article. As a result, in one embodiment, it is desired to balance, and to the extent possible, match the shrink rates of the model and support materials to minimize stress during sintering, as shown in FIGS. 11E, 11F.

INDUSTRIAL APPLICABILITY

The disclosed ink compositions, methods of making such compositions and methods of using such compositions may be applicable to 3D printing objects, such as composites of materials. Such objects and composites may be made by printing onto a support, a model using a plurality of model inks according to the present disclosure and removing the support structure in a post printing step. Another method can involve retaining the support structure in the finished object with the model material being infiltrated by the support material, or vice versa.

Reference is made to FIGS. 12A and 12B, which show schematic of objects built with different materials. Often the required object includes different materials in different parts of the object, such as a core material, and more or more coating layers. One embodiment shows a bulk material 1202 of a first object 1200 and 1201, laminated (coated) with a coating material 1204 at an outer surface of the first object.

As shown in FIG. 12B, in one embodiment, there are multiple layers 1204 and 1206 on the bulk material 1202. In an alternate technique, one layer can be printed by one material and another layer by another material. A special case is impregnation-like of a coating-like material 1206 at the outer surface of an object, or between the object and a top layer. The impregnation-like can include a gradual decrease of the proportion of impregnating material and bulk material as the distance from the object surface increases. In this way, a functionally graded material can be produced that achieves different functions, such as color, thermal or mechanical properties, as the gradient changes.

Referring now to FIG. 13A, there is shown a representation of an object built with a mix of materials according to the present disclosure. In this embodiment, the object 1300 includes a mix of two or more materials either over the entire object or over part of the object. The object 1300 includes a mix of a first material (1304) and a second material (1306). With reference to FIG. 13B, when a section of the object 1300 is enlarged 1310, the mix of materials can be seen in that each pixel (1312 and 1314) is composed of alternating materials 1304 and 1306.

Method and System For Printing Mixed Materials

One technique for printing an object with a mix of materials according to the present disclosure in a given location of a layer can be done by dispensing one material in certain pixels of the layer and another material in other pixels. A plurality of inks and ink heads can be used to differentiate printing between object materials and object support. According to an embodiment, one ink can be used to build both the object and support structures (layer by layer), while another ink is dispensed only on the layer part that belongs to only one of the object or support, introducing thereby a difference in a mechanical attribute of both materials. This difference can impart improved and desired properties to the finished object, or used to facilitate post-printing removal of the support from the object. For example, a first ink, such as WC particles, can be used to print both object and support layer portions. A second ink, such as Cobalt material or particles, can be dispensed only in the object portion of the layer. When printing finishes, and after the printed complex has been fired in an oven, a substantial difference is introduced between both materials (the support of only WC particles stays un-sintered, while the object is sintered or at least formed of a solid matrix of WC in Cobalt. This difference enables removing the support from the object.

System for Printing Mixed Materials. As shown, there is described an additive manufacturing system for forming a composite three-dimensional product from at least two differing materials. In an embodiment, the system comprises at least one print head region configured to retain a first group of print nozzles configurable to additively print layers of a first object-material and a second group of nozzles configurable to additively print layers of a second object-material. In one embodiment, the first object material is a metal and the second object material is a ceramic.

The above described system may further comprises at least one processor configured to receive instructions for printing the composite three-dimensional product and to control the first group of print heads and the second group of print heads in accordance with the instructions. For example, in an embodiment, the first group of print heads and the second group of print heads are controlled to sequentially form the product from multiple additive layers, such that first group of nozzles and the second group of nozzles respectively deposit on a pixel-by-pixel basis the first object-material and the second object-material in a common layer and thereafter respectively deposit first object-material and second object-material in a succeeding layers. In an embodiment, the succeeding layers includes at least one of a second object-material pixel atop a first object-material pixel and a first object-material pixel atop a second object-material pixel.

In one embodiment, the controller is configured to cause the first object-material and second object-material to interface.

In one embodiment, the controller is configured to encapsulate at least a portion of the second object-material material within the first object-material.

In one embodiment, the first group of nozzles is configurable to additively print layers of the first object-material from a first ink composition and the second group of nozzles is configurable to additively print layers of the second object-material from a second ink composition. In an embodiment, the first ink composition and the second ink composition include a dispersing agent chosen so that when jetted together in liquid form and combined there is substantially no phase separation and substantially no diffusion between the first and second inks.

In one embodiment, the product is a green part and wherein the green part includes binder in an amount ranging from 2% to 20% by volume, such as from 4% to 15%, or from 5% to 10%.

In one embodiment, the green part comprises solid particles in an amount ranging from 50% to 70% by volume, such as from 55 to 65% by volume.

In one embodiment, the green part has a porosity ranging from 2% and 20%, such as from 5% to 10%.

Figure 14:
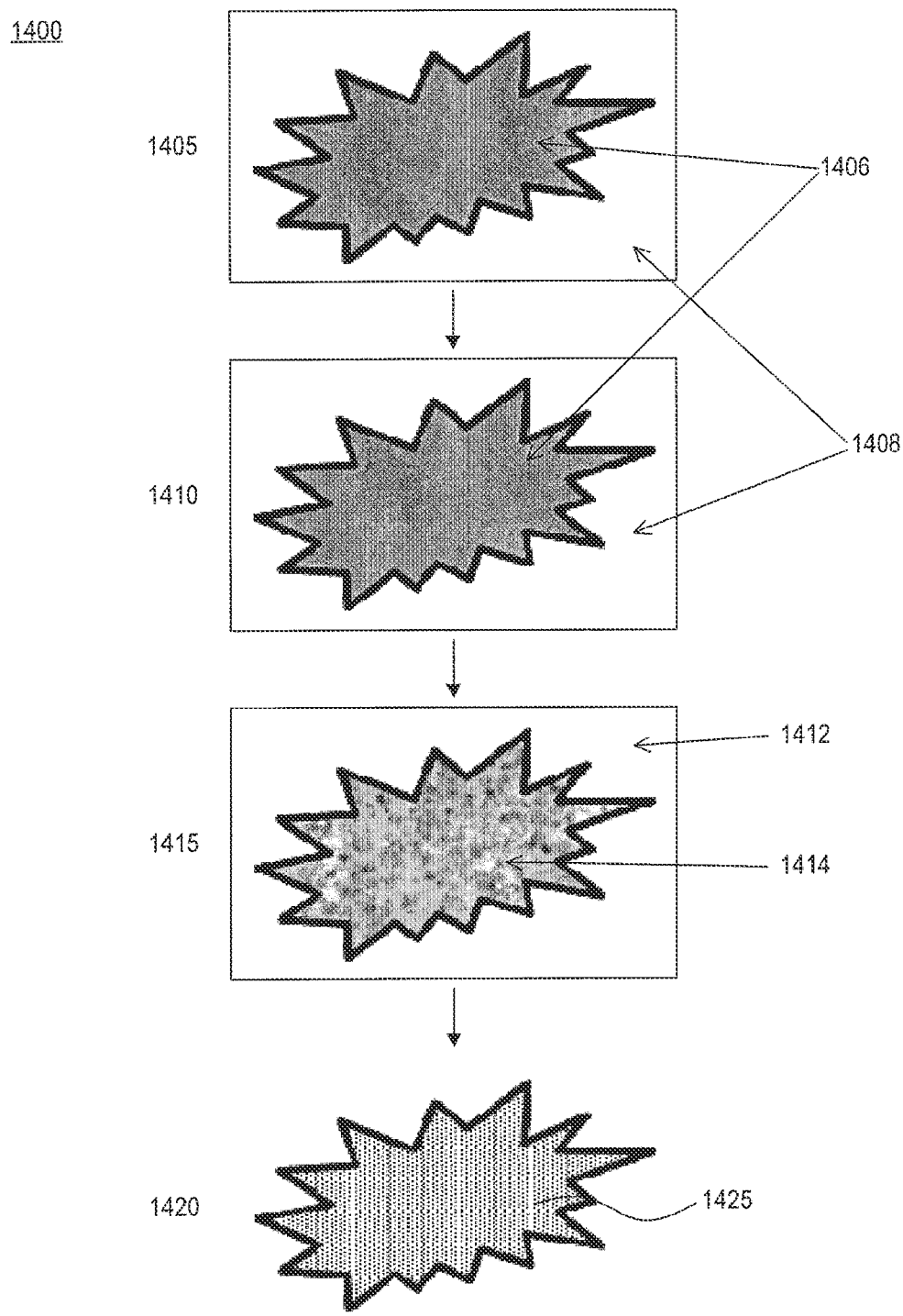
FIG. 14 is a flow diagram of making a composite object according to the present disclosure by infiltrating the model material with the support material.

In another embodiment, that is represented in the Flow Diagram in FIG. 14, a composite can be made by using a support that remains an integral part of the finished product. In this embodiment, the support can infiltrate into a porous model to produce composite material. As there is no need to remove support, this method allows a material that can made using a single sintering step, thereby simplifying processing and reducing and costs to make the composite. In addition, the resulting sintered composite can exhibit improved physical and chemical properties.

Method of Forming a Composite by Printing Mixed Materials. With reference to FIG. 14, an exemplary process 1400 starts with a printing step 1405 that forms a model 1406 on a metal oxide as support 1408. The next step 1410 comprises heating the printed article to a temperature ranging from 500 to 800° C. such that the metal oxide removes the oxygen and reduces the compound to a metal. The decomposition of the metal oxide to results in the model being surrounded by another metal. Continued heating at higher temperatures 1415 then lead to the model and support particles 1412 starting to sinter without change of dimension. The result is the formation of a brown part 1414. Finally, at higher temperature 1420 the support metal will melt and infiltrate into the porous model, thereby forming a composite material of model material and support metal 1425.

In one embodiment, there is disclosed a composite comprising a model made of tungsten carbide (WC) and support made of cobalt oxide (CoO). This embodiment takes advantage of the fact that CoO will lose the oxide above 500° C. in the following manner: $Co_3O_4 \rightarrow CoO \rightarrow Co$. In addition, it is known that WC will start sintering above 900° C. without change in geometry that due to particle shape (sharp edges). In another words, because WC is not circular, particles larger than 10ths of nanometers will start hardening at 900° C. because the sharp edges of the particles will start connect to surfaces of close particles and make physical connection between particles.

Once the temperature reaches 1400° C., cobalt will infiltrate into the inherent porosity of WC to produce a composite material.

In addition to a one step sintering process, this method has a number of other beneficial properties, including use of the support material (as opposed to discarding the support material). This process also allows the use of many combinations of model and support materials, with no contamination between support and model materials. For example, it has been found that it is very easy to prepare support ink from metal oxide or ferrous carbonates.

In one embodiment, there is disclosed a model material comprising WC and a support material comprising ferrous carbonate. It is known that ferrous carbonate will change states to ferrous oxide at 800° C., and then lose oxide above 900° C. Further heat treatment at 1500° C. Fe will allow the iron to infiltrate into the WC.

A model material comprising WC can be used with a variety of support materials, such as metal oxides, including copper oxide and cobalt oxide. Additional support options can be chosen from eutectic oxide materials, such as Fe oxide or Co oxide. At high temperature (such as >500° C.) the oxide will decompose. As temperature increases further, infiltration will occur.

Additive Printing System for Simultaneously Printing and Colorizing

As previously described, the disclosed system(s) allow for the printing a three dimensional parts, including composites, which can be further modified by printing an external coating that is colored to give a product having a desired color. In this embodiment, there is further described an additive printing system for simultaneously printing and colorizing a product using colorized structural particles.

System for Simultaneously Printing and Coloring a Product. The foregoing description is relevant to this embodiment and to the following discussion. In an embodiment, there is described a system that comprises at least one print head region configured to retain: a first group of print heads configurable to additively print a first colorized structural material of a first color; and a second group of print heads configurable to additively print a second colorized structural material of a second color different from the first color.

In an embodiment, the system described herein further comprises and at least one processor configured to receive information reflective of desired structural properties and color properties of the product; and regulate the first group of print heads and the second group of print heads based on the information reflective of the desired structural properties and color properties of the product, such that as the product is additively formed, colorized particles are mixed in controlled proportions to simulated the desired color properties.

The system described herein may further comprises at least a third group of print heads configurable to additively print using at least a third colorized structural material of at least a third color different from the first color and the second color. In an embodiment, the first colorized structural material, the second colorized structural material, and the third colorized structural material are sinterable such that the simulated desired color properties occur after sintering.

In an embodiment, the at least a third group of print heads are configurable to additively print using at least a third colorized structural material includes multiple subgroups, each sub-group being configurable to additively print using a differing colorized structural material.

The first colorized structural material, the second colorized structural material, and the at least a third colorized structural material may include ceramic particles, as previously described herein. For example the ceramic particle may be selected from at least one of $Al_2O_3$, $TiO_2$, $Y_2O_3$, CoO, CuO, ZnO, MgO, $ZrO_2$, and $FeCO_3$.

In an embodiment, the first colorized structural material, the second colorized structural material, and the at least a third colorized structural material include those previously described herein. For example, the first, second and third colorized structural material may comprise metal particles, such as at least one metal, metal oxide, carbide, and metal alloy selected from iron, copper, silver, gold, titanium, $SiO_2$, $TiO_2$, $BiO_2$, WC, $Al_4C_3$, TiC, stainless steel, and titanium-based composites.

In an embodiment, the first colorized structural material, the second colorized structural material, and the at least a third colorized structural material include synthetic structural particles, such as those previously described herein. For example, the synthetic structural particles may comprise a copolymer chosen from polyaniline alcohol (PAN) polymer, ethylene vinyl acetate copolymer, a cellulosic polymer chosen from ethyl cellulose, carboxymethyl cellulose, hydroxypropyl methyl cellulose, cellulose acetate, and polybutyrals. The copolymer may comprise a sol-gel derived silica, tetraethoxysilane (TEOS) and 3-glycidyloxypropyltrimethoxysilane.

The additive manufacturing system for forming an object with a desired surface color, the system comprising: at least one print head region configured to retain: a first group of print heads configurable to print a three dimensional object having an inner core portion and an outer surface portion; and a second group of print heads configurable to deposit on the outer surface portion a color coating having a coloring that differs from a coloring of the core, wherein the second group of print heads are configured to deposit a plurality of differing colors.

This additive manufacturing system may further comprise at least one processor configured to receive a 3D digital representation of the object, including a desired shape of the object and a desired surface coloring with color shading that varies across a surface of the object, and analyze the desired surface coloring to identify color shading in the desired surface coloring.

The processor can further be configured to control the first group of print heads to additively form the three dimensional object and control, during additive formation of the three dimensional object, the second group of print heads to deposit a mixture of colors that varies across the surface of the object, to thereby simulate across the surface of the object a color shading corresponding to the desired variable surface coloring.

In one embodiment, the at least one processor is configured to analyze the desired coloring on a pixel by pixel basis, and to cause the second group of print heads to deposit varying colors to simulate on a pixel by pixel basis, the desired coloring. For example, the second group of print heads may be configured to print colorized ceramic material using a plurality of print heads segregated into CMYK [cyan, magenta, yellow and key (black)] tints.

In one embodiment, the first group of print heads includes a metal subgroup configured to print the core from metal and a ceramic subgroup, configured to print adjacent the metal core, the outer surface from ceramic material. For example, the metal subgroup comprises at least one of stainless steel, and Titanium, Ti64, and the ceramic subgroup is configured to print at least one of $SiO_2$, $TiO_2$, $ZrO_2$, $BiO_2$.

In an embodiment, the second group of print heads is configurable to deposit material for providing a glossy transparent coating after sintering, such as a glass material.

In this embodiment, the first group of print heads includes a first subgroup configured for printing the inner core and a second subgroup configured for printing the outer surface portion. When the additive manufacturing system is used to print a prosthetic tooth, the first group of print heads includes a first subgroup configured for printing the inner core of the prosthetic tooth, and a second subgroup configured for printing the outer surface portion of a prosthetic tooth.

It will be apparent to those skilled in the art that various modifications and variations can be made to the disclosed inks and methods of forming titanium parts using ink jet printing techniques, without departing from the scope of the disclosure. Alternative implementations will be apparent to those skilled in the art from consideration of the specification and practice disclosed herein. It is intended that the specification and examples be considered as exemplary only.

What is claimed is:

1. A method of making an object by ink jet printing, the method comprising:
    jetting object material including particles to form a product structure, the object material having a first sintering temperature;
    simultaneous with or prior or before to forming the product structure, jetting support material including particles, to form a support structure, wherein the support structure is jetted in a manner supporting a product structure, and wherein the support material has a sintering temperature that is greater than the sintering temperature of the object material, the jetted object and the jetted support together constituting a green part;
    heating the green part to a temperature at or above the first sintering temperature and below the second sintering temperature to thereby at least partially sinter the jetted object without substantially sintering the jetted support; and
    removing the substantially unsintered support from the at least partially sintered object;
    wherein a barrier layer is not formed between the product structure and the support structure.

2. The method of claim 1, wherein the support particles include at least one of $SiO_2$, $Al_2O_3$, $TiO_2$, $Y_2O_3$, CoO, CuO, ZnO, MgO, $ZrO_2$, and $FeCO_3$.

3. The method of claim 1, wherein the solid particles of at least one of the support and the object materials include at least one metal, metal oxide, carbide, and metal alloy selected from iron, copper, silver, gold, titanium, $SiO_2$, $TiO_2$, $BiO_2$, WC, $Al_4C_3$, TiC, stainless steel, and titanium-based composites.

4. The method of claim 1, wherein the object material has a sintering temperature of at least 100° C. lower than the sintering temperature of the support material.

5. The method of claim 1, wherein sintering is carried out in a single step or in multiple steps, wherein said sintering is carried out in an oven or through the use of a laser energy, microwave energy, plasma energy, or through use of a high energy lamp.

6. The method of claim 1, wherein the support particles have at least one of a particle size or particle size distribution or material that cause the support to sinter at a temperature higher than the object particles.

7. The method of claim 1, wherein the object material comprises doping nanoparticles.

8. A method of making an object by ink jet printing, the method comprising:
    jetting object material including particles to form a product structure, the object material having a first sintering temperature;
    simultaneous with or prior or before to forming the product structure, jetting support material including particles, to form a support structure, wherein the support structure is jetted in a manner supporting a product structure, and wherein the support material has a sintering temperature that is greater than the sintering temperature of the object material, the jetted object and the jetted support together constituting a green part;
    heating the green part to a temperature at or above the first sintering temperature and below the second sintering temperature to thereby at least partially sinter the jetted object without substantially sintering the jetted support; and
    removing the substantially unsintered support from the at least partially sintered object;
    wherein the object material comprises doping nanoparticles.

9. A method of making an object by ink jet printing, the method comprising:
    jetting object material including particles to form a product structure, the object material having a first sintering temperature;
    simultaneous with or prior or before to forming the product structure, jetting support material including particles, to form a support structure, wherein the support structure is jetted in a manner supporting a product structure, and wherein the support material has a sintering temperature that is greater than the sintering temperature of the object material, the jetted object and the jetted support together constituting a green part;
    heating the green part to a temperature at or above the first sintering temperature and below the second sintering temperature to thereby at least partially sinter the jetted object without substantially sintering the jetted support; and
    removing the substantially unsintered support from the at least partially sintered object;
    wherein at least one of the support material and the object material is selected to be a doping agent for the other.

* * * * *